United States Patent
LoGalbo et al.

(10) Patent No.: US 7,945,680 B2
(45) Date of Patent: May 17, 2011

(54) METHOD AND APPARATUS FOR PEER TO PEER LINK ESTABLISHMENT OVER A NETWORK

(75) Inventors: Bob LoGalbo, Rolling Meadows, IL (US); Thomas B. Bohn, McHenry, IL (US); Bradley M. Hiben, Glen Ellyn, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 591 days.

(21) Appl. No.: 11/928,321

(22) Filed: Oct. 30, 2007

(65) Prior Publication Data

US 2009/0113059 A1   Apr. 30, 2009

(51) Int. Cl.
G06F 15/173 (2006.01)
(52) U.S. Cl. ......... 709/227; 709/206; 709/223; 370/352
(58) Field of Classification Search .................... 709/223
See application file for complete search history.

(56) References Cited

U.S. PATENT DOCUMENTS

| | | | |
|---|---|---|---|
| 7,573,867 B1* | 8/2009 | Welch | 370/352 |
| 2003/0112823 A1 | 6/2003 | Collins et al. | |
| 2004/0249911 A1* | 12/2004 | Alkhatib et al. | 709/223 |
| 2006/0085548 A1 | 4/2006 | Maher, III et al. | |
| 2009/0182815 A1* | 7/2009 | Czechowski et al. | 709/206 |

FOREIGN PATENT DOCUMENTS

EP   1657939 A1   5/2006

* cited by examiner

*Primary Examiner* — Yves Dalencourt
(74) *Attorney, Agent, or Firm* — Simon B. Anolick; Valerie M. Davis

(57) ABSTRACT

A method and apparatus for linking to a Peer-to-Peer ("P2P") network for VOIP communications. An intermediary peer creates a map to link peers together in the P2P network. A series of messages are generated to open the ports of one peer to be accessible to other peers on the P2P network. Peers are then enabled to communicate directly with other peers. Steward peers can assume the functionality of the intermediary peer.

8 Claims, 13 Drawing Sheets

| peerID | sourceIP | sourcePORT |
|---|---|---|
| peer1 | 146.2.131.201 | 33456 |
| peer2 | 186.45.25.179 | 17934 |

*FIG. 3A*

| peerID | sourceIP | sourcePORT |
|---|---|---|
| peer1 | 146.2.131.201 | 33457 |
| peer2 | 186.45.25.179 | 17935 |
| peer3 | 249.239.54.123 | 58922 |

*FIG. 3B* understand- # METHOD AND APPARATUS FOR PEER TO PEER LINK ESTABLISHMENT OVER A NETWORK

FIELD OF THE INVENTION

The present invention relates generally to internet telephony. The invention relates, more particularly, to the link establishment and maintenance of Peer to Peer internet telephony.

BACKGROUND

Voice over Internet Protocol (hereinafter "VOIP") is the routing of conversations over the internet or through an Internet Protocol (hereinafter "IP") based system. VOIP is increasing in popularity and use. Systems to establish conference calling through VOIP have increased as well. These systems have experienced rapid growth in both popular usage and software development.

One challenge facing VOIP conference calling systems is the routing of VoIP traffic through firewalls and address translators. Private Session Border Controllers are used, along with firewalls, to enable VoIP calls to and from a protected enterprise network. Some VOIP systems use Peer-to-Peer (hereinafter "P2P") networks to overcome various VOIP technical issues such as throughput and access delay.

Some VOIP protocols route calls from one peer through a controller peer to other peers on the network, allowing the system to traverse Network Address Translators (hereinafter "NATs") and firewalls. The NATs and firewalls prevent peers from communicating directly with each other. A controller (hereinafter "Intermediary") peer receives the call and routes it to remaining peers on the network. However, currently no technique exists for a peer to place a group call directly to all the remaining peers (i.e., peer-to-peer) on the network in which all the peers are behind NAT's/Firewalls. Stated another way, all voice packets are routed through a central point, e.g., an Intermediary peer, on the P2P networks. Then, the Intermediary peer relays the voice packets to the destination peer on the P2P network.

What is needed is a method and apparatus to enable open paths through NATs and firewalls so that any one peer can receive unsolicited voice packets directly from any number of peers to enable a minimum delay group call.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3*a* is an example of a Peer ID Map in accordance with some embodiments of the invention.

FIG. 3*b* is an example of an updated Peer ID Map in accordance with some embodiments of the invention.

DETAILED DESCRIPTION

Figure 1:
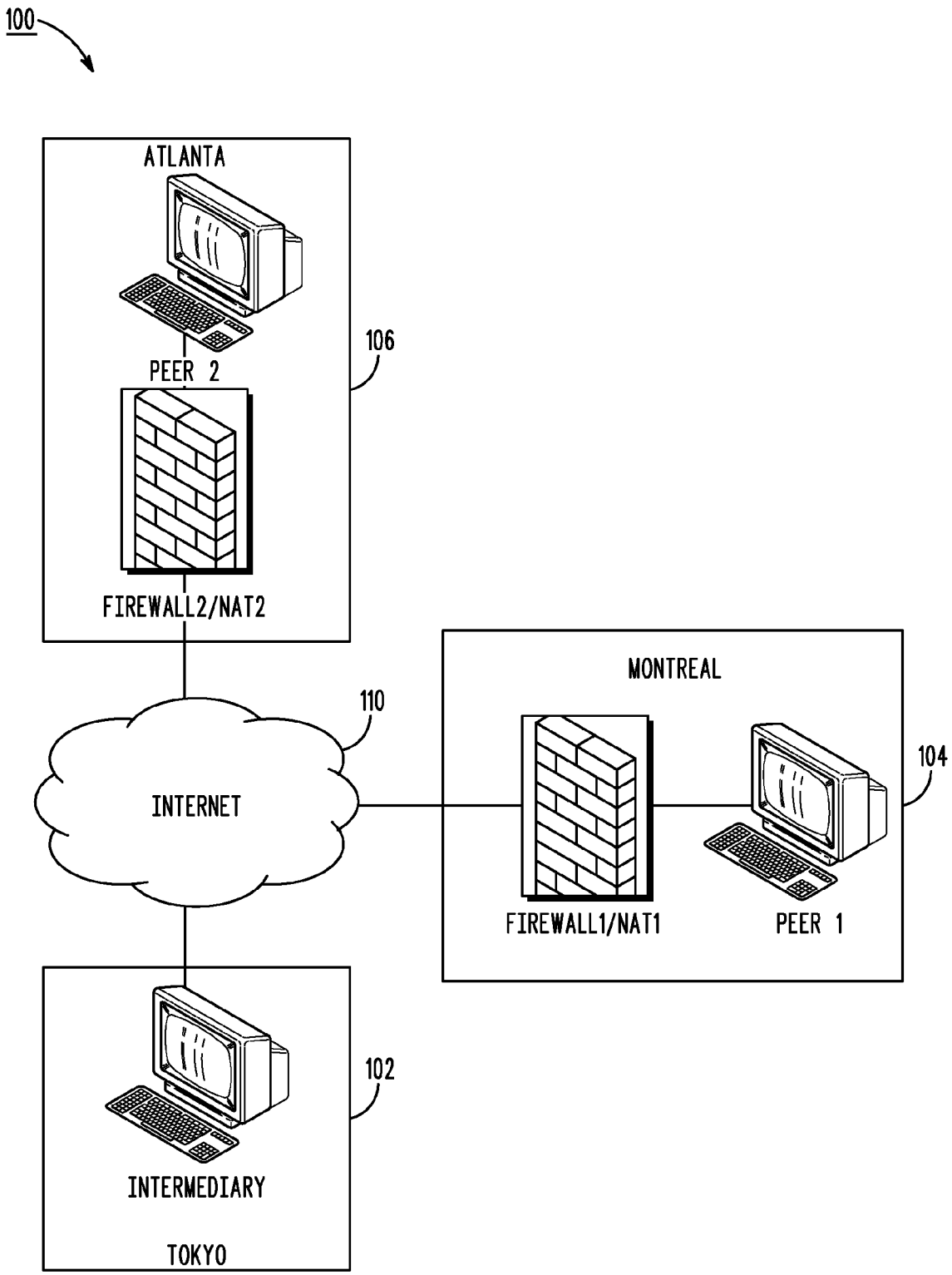
FIG. 1 is an example of a P2P Topology in accordance with some embodiments of the invention.

Before describing in detail embodiments that are in accordance with the present invention, it should be observed that the embodiments reside primarily in combinations of method steps and apparatus components related to Peer to Peer link establishment over a network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including" or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of Peer to Peer link establishment over a network described herein. The non-processor circuits may include, but are not limited to, a radio receiver, a radio transmitter, signal drivers, clock circuits, power source circuits, and user input devices. As such, these functions may be interpreted as steps of a method to perform Peer to Peer link establishment over a network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Methods for link establishment to a Peer-to-Peer ("P2P") network are disclosed. Various methods include transferring messages to maintain existing peer linkages and transferring messages to establish new linkages to the P2P network. Additional methods include logging of messages for simultaneous linking and the transferring of linking functions from an Intermediary Peer to Steward Peer.

An apparatus for establishing links to a P2P network is disclosed. The apparatus comprises an Intermediary peer operable to receive and acknowledge messages from existing peers; receive requests to join the P2P network, and link new peers to the P2P network. The Intermediary peer is further operable to identify peers capable of performing the Intermediary Peer's functions. The Intermediary Peer is operable to transfer the Intermediary Peer functions to the capable peers.

Referring now to FIG. 1, an example of a P2P topology is shown. A P2P network 100 comprises an Intermediary Peer 102 (hereinafter "Intermediary") data connected to a Peer1 104 and a Peer2 106 through a communication network, such as the internet 110. Artisans of ordinary skill will appreciate that the showing of two peers connected, via a communication network 110, to the Intermediary is exemplary only and that numerous peers can be connected. The Peers 104, 106 and Intermediary 102 can be located in the same building, in multiple buildings in the same city, in multiple cities, or in any combination thereof.

A peer is an entity required to manage and distribute audio to the other peers in the network 110. This peer function may be built into a Cypher station, such as the MOTOTRBO fixed station by Motorola; or it may be built in a separate box, which physically resides adjacent to the Cypher station.

The functionality of the Intermediary 102 is unique. The Intermediary 102 may reside as a separate box or computer, or it may be a part of a peer, such as Peer1 104 or Peer2 106, on the network 100. The Intermediary 102 is a central point for all peers to find all other peers on the network 100. For example, the Intermediary 102 is a central point for Peer1 104 to find Peer2 106, and for Peer2 106 to find Peer1 104. The Intermediary 102 is the one peer in the network 100 designated, through provisioning, to be the initial contact for other peers, such as Peer1 104 and Peer2 106, when the peers power-up or when a potential peer intends to join the P2P network. The purpose of the Intermediary 102 is to provide addresses of the peers in the network 100, such as Peer1 104 and Peer2 106, to the potential peer intending to join the network 100.

Peer1 104 can be a Personal Computer (hereinafter "pc") or it can be a user talking through a pc. Peer1 can also be a fixed base station. Peer1 104 can be data connected to the internet 110 through a Network Address Translator ("NAT") and firewall. The NAT-firewall combination is a device that combines the NAT and firewall functions.

The firewall prohibits the receiving of any communication (e.g., voice) packets sent to Peer1 104 from the internet 110. This is accomplished through the use of IP signaling. More specifically, the firewall uses User Datagram Protocol (hereinafter "UDP") and Transfer Control Protocol (hereinafter "TCP") headers. The UDP is one of the core protocols of the IP suite. Using UDP, programs on networked computers can send short messages sometimes known as datagrams (using Datagram Sockets) to one another. UDP is sometimes called the Universal Datagram Protocol. TCP is another of the core protocols of the IP suite; often simply referred to as TCP/IP. Using TCP, applications on networked hosts can create connections to one another; over which they can exchange streams of data. The protocol guarantees reliable and in-order delivery of data from sender to receiver. TCP also distinguishes data for multiple connections by concurrent applications (e.g., Web server and e-mail server) running on the same host. The UDP/TCP headers include a port number. The firewall reads the port number in the UDP/TCP header. The firewall then keeps that port, corresponding to the read port number in the UDP/TCP header, open for a defined period of time. Therefore, a communication packet is allowed to be received by Peer1 104 from the internet 110 providing a first packet was sent previously from Peer1 104 to the internet 110 on that port.

The NAT translates a source IP address and a source Port number to a new IP address and a new port number. The NAT translates the IP address and Port numbers for all packets sent to the internet 110 and received from the internet 110.

Peer2 106 is data connected to the internet 110 through a NAT and firewall as well. Therefore, due to the respective firewalls, Peer1 104 and Peer2 106 are incapable of communicating directly with each other.

The Intermediary 102 can be connected directly to the internet 110. In other words, the Intermediary 102 has a data connection to the internet 110 that is not through a NAT and firewall. However, if the Intermediary 102 is connected to the internet 110 through a firewall, the Intermediary 102 may have at least one port open on its firewall at all times. The Intermediary 102 has a static IP address. Therefore, the Intermediary 102 can receive packets from Peer1 104 and Peer2 106 at any time. The Intermediary 102 keeps a table of peer ID vs. peer Address (described herein below with respect to the "Map 300"). The Intermediary 102 can also communicate with any potential peer not in the network 100. Thus, the Intermediary 102 can receive packets from peers not on the network 100. The Intermediary 102 can also operate to perform port forwarding between peers 104, 106. Port forwarding is a function whereby, for example, the Intermediary 102 communicates with Peer1 104 so that Peer1 104 will open its ports to Peer2 106. Port forwarding allows Peer1 104 and Peer2 106 to communicate directly with each other. The Intermediary 102 is also capable of seeing the translation occurring at the NATs. Therefore, the Intermediary 102 facilitates direct communication between Peer1 104 and Peer2 106. As such, Peer1 104 and Peer2 106 can be linked together.

Maintaining Existing Links

Figure 2:
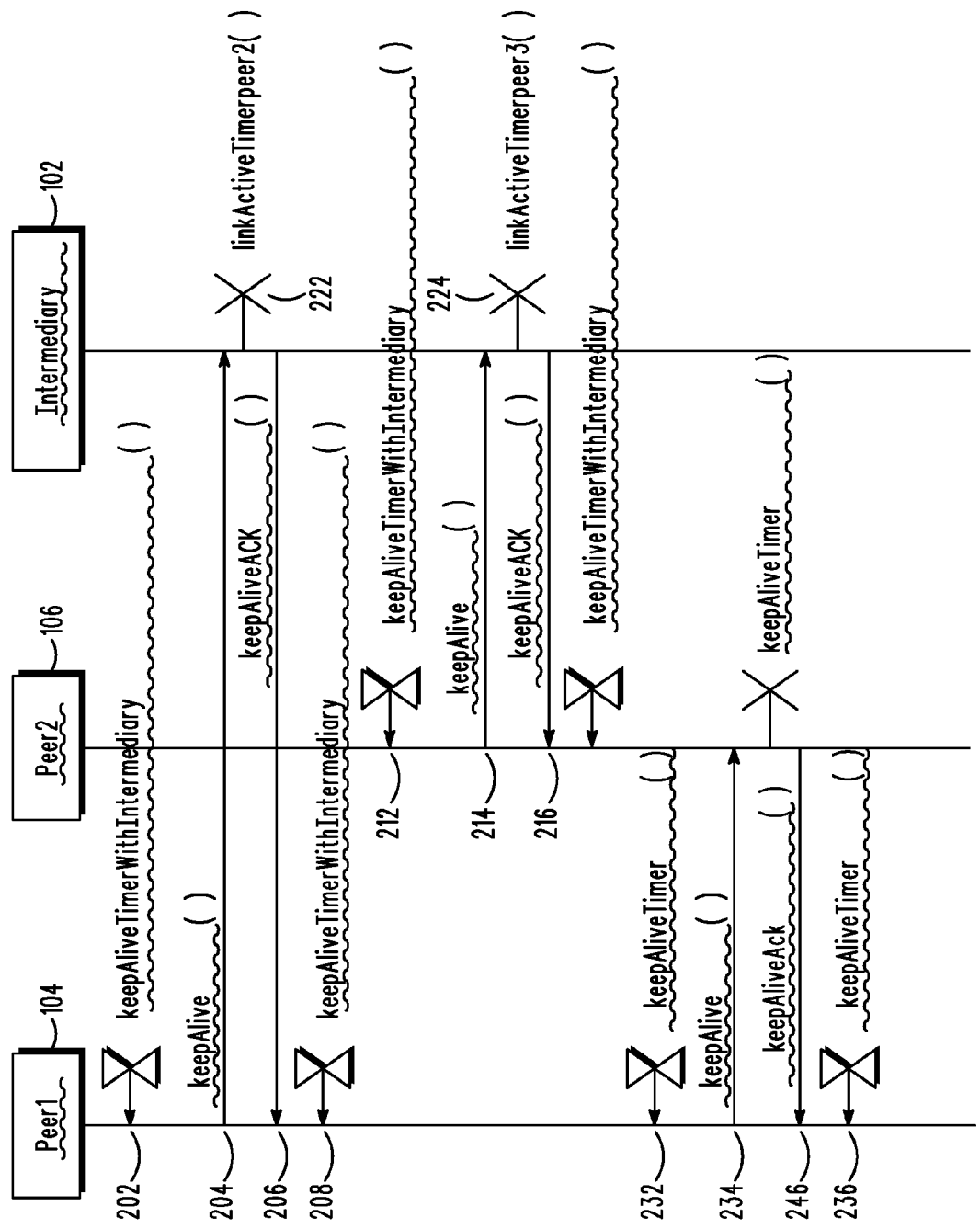
FIG. 2 is an exemplary message sequence for maintaining peers in accordance with some embodiments of the invention.

Referring now to FIG. 2, an exemplary message sequence for maintaining peer connections in the P2P network is shown. Peer1 104 and Peer2 106 have established links with the P2P network 100. Peer1 104 has a timer called a keepAliveTimerwithIntermediary. The keepAliveTimerwithIntermediary is a wait timer that is used to ensure a valid link is maintained with the Intermediary 102. However, while in this state, Peer1 104 can receive signals to update and synchronize the Map 300 and a Command Map 516 (discussed with respect to FIG. 6 herein below), called an UDP_SYN_CommandMap. The signals Peer1 104 can receive are sent from the Intermediary 102, resulting from the prompting from other Peers subsequently seeking a connection to the network 100. The keepAliveTimerwithIntermediary is set to a range of fifteen to forty-five seconds and counts down to zero seconds. If the keepAliveTimerwithIntermediary expires 202, Peer1 104 sends a signal, called keepAlive message, 204 to the Intermediary 102. The keepAlive message 204 is an IP packet. The keepAlive message 204 comprises a code identifying it as a keepAlive message. The keepAlive message 204 is sent by Peer1 104 to inform the Intermediary 102 that Peer1 104 still has a data communication link with the Intermediary 102. When the Intermediary 102 receives a keepAlive message 204 from Peer1 104, the Intermediary 102 sends an acknowledgement signal, called a keepAliveACK message, 206 back to Peer1 104. The keepAliveACK message 206 is a signal sent by the Intermediary 102 to the peer, e.g., Peer1 104, informing the peer that the keepAlive message was received by the Intermediary 102. Therefore, upon receipt of the keepAliveACK message 206, Peer1 104 understands that a data connection is active between Peer1 104 and the Intermediary 102. When Peer1 104 receives the keepAliveACK message 206 from the Intermediary 102, Peer1 104 resets the keepAliveTimerwithIntermediary 208 to the previously set value in the range of fifteen to forty-five seconds. Then, the keepAliveTimerwithIntermediary 208 restarts. Peer1 104 also has a counter (not shown) that is used to track the number of consecutive times Peer1 104 has not received a keepAliveACK message 206 in response to the keepAlive message 204. When Peer1 104 receives the keepAliveACK message 206, Peer1 104 resets this counter, referenced as a peerIntermediaryKeepAliveFailureCount, to zero.

Peer2 106 also has a keepAliveTimerwithIntermediary 212. As stated herein above, the keepAliveTimerwithIntermediary 212 is a timer that is used to ensure a valid link is maintained with the Intermediary 102. The keepAliveTimerwithIntermediary 212 is set to a range of fifteen to forty-five seconds and counts down to zero seconds. If the keepAliveTimerwithIntermediary 212 expires, Peer2 106 sends a keepAlive message 214 to the Intermediary 102. As stated hereinabove, the keepAlive message 214 is an IP packet. The keepAlive message 214 comprises a code identifying it as a keepAlive. When the Intermediary 102 receives the keepAlive message 214 from Peer2 106, the Intermediary 102 sends a keepAliveACK message 216 back to Peer2 106. Peer2 106 receives the keepAliveACK message 216 from the Intermediary 102. Peer2 106 then resets the keepAliveTimerwithIntermediary 218 to the previously set value in the range of fifteen to forty-five seconds. Peer2 106 also resets a peerIntermediaryKeepAliveFailureCount to zero (not shown).

Peer1 104 and Peer2 106 send the keepAlive messages 204, 214 every 15 to 45 seconds as stated above. The keepAlive messages 204, 214 can be sent consecutively or during overlapping time periods. For example, Peer1 104 can send the keepAlive 204. Prior to the Intermediary 102 responding to Peer1 104 with the keepAliveACK 206, Peer2 can send its keepAlive message 214. The Intermediary 102 can respond to each keepAlive message 204, 214 respectively. Additionally, the Intermediary 102 can receive the keepAlive message 214 from Peer2 106 after the keepAliveACK 206 has already been sent to Peer1 104. The keepAlives 204, 214 and associated keepAliveACKs 206, 216 are used to enable Peer1 104 and Peer2 to receive communication from the Intermediary 102 by opening respective ports on the Peers 104, 106. If the keepAlives 204, 214 or keepAliveACKs 206, 216 are not sent or received respectively, the Peers 104, 106 will not be able to communicate with the P2P network 100. Any signaling received by Peer1 104 or Peer2 106 from the Intermediary 102 resets Peer1's and Peer2's keepAliveTimerwithIntermediary as if a keepAliveACK was received from the Intermediary 102.

The Intermediary 102 has a P2P Map 300 (hereinafter "Map") which is a registry of all Peers 104, 106 that are actively part of the network 100: the Map is referenced as the peerIDPeerAddressMap. The Map 300 has the peer ID's of Peers 104, 106 that are connected to the network 100. The Map also includes Peer1's 104 and Peer2's 106 respective addresses and port numbers (i.e. a simple mapping of one peer ID to at least one peer IP address and port). The map includes an entry for every occurrence of a unique peer ID, IP address and port. The Intermediary 102 tags the Map 300 with a release version and a local timestamp. This timestamp can be based on the date and time to avoid repetition and increase the likelihood of uniqueness. The keepAlives 204, 214 update the addresses and port numbers of the respective Peers 104, 106 and the updated addresses/port numbers are logged by the Intermediary 102 into an updated peerIDPeerAddressMap 300. The Map 300 is then re-versioned and re-timestamped. The Map 300 is described in further detail with respect to FIG. 3a and Table 1 herein below.

The Intermediary 102 has a timer, called a linkActive timer, that is used to evaluate the links that the Intermediary 102 maintains with each Peer 104, 106. The linkActive timer is set to a range of one to four minutes and counts down to zero seconds. The Intermediary 102 has a linkActive timer for the link with Peer1 104. The Intermediary also has a linkActive timer for the link with Peer2 106. When the keepAlive 204 is received from Peer1 104, the Intermediary 102 resets the linkActive timer 222 to the previously set value in the range of one to four minutes. However, if the Intermediary 102 does not receive the keepAlive 204 from Peer1 104, the linkActive timer expires. The Intermediary 102 then removes Peer1 104 from the Map 300. The same applies with respect to the receipt of the keepAlive 214 from Peer2 106. The Intermediary 102 resets the linkActive timer 224 to the previously set value in the range of one to four minutes when the keepAlive 214 is received. If the Intermediary 102 does not receive the keepAlive 214, the linkActive timer expires and Peer2 106 is removed from the Map 300.

Therefore, the Peers 104, 106 each have a keepAliveTimerwithIntermediary 202, 212 and the Intermediary 102 has a linkActive timer 222, 224 with each Peer 104, 106. The Peers 104, 106 send the keepAlives 204, 214 when their respective keepAlive timer expires. The Intermediary 102 resets the linkActive timer 222, 224 when the respective keepAlive 204, 214 is received. The Intermediary 102 removes links to the Peers 104, 106 when the corresponding linkActive timer 222, 224 expires. The Intermediary 102 removes the link to the Peer 104, 106 by deleting the row in the Map 300 corresponding to the Peer 104, 106. If, for example, the linkActive timer 222 expires, the Intermediary removes the link to Peer1 104. When Peer1 104 is removed from the Map 300, then Peer1 104 is considered unavailable.

If the keepAliveTimerwithIntermediary 202 for Peer1 104 expires, Peer1 104 may have lost its link with the Intermediary 102. The link with the Intermediary 102 may have been lost because: the link between Peer1 104 and the internet 110 is no longer viable; the link between the Intermediary 102 and the internet 110 is no longer viable; or the Intermediary 102 is offline. Peer1 104 increments the peerIntermediaryKeepAliveFailureCount by one. Peer1 104 sends another keepAlive 204 to the Intermediary 102. Peer1 104 resets the keepAliveTimerwithIntermediary 202 to zero. If the keepAliveTimerwithIntermediary 202 expires again, then Peer1 104 increments the peerIntermediaryKeepAliveFailureCount by one. Peer1 104 sends another keepAlive 204 to the Intermediary 102. Peer1 104 again resets the keepAliveTimerwithIntermediary 202. Peer1 104 repeats this process until it receives a keepAliveACK 206 from the Intermediary 102 or the peerIntermediaryKeepAliveFailureCount is greater than or equal to a predetermined maximum failure count, called a peerIntermediaryKeepAliveFailureCountMax. The peerIntermediaryKeepAliveFailureCountMax is a value representing the maximum number of attempts a peer will make without receiving and keepAliveACK back from the Intermediary 102. For example, the peerIntermediaryKeepAliveFailureCountMax could be set to 40. If the peerIntermediaryKeepAliveFailureCount is greater than or equal to the peerIntermediaryKeepAliveFailureCountMax, Peer1 104 believes it has lost its link with the Intermediary Peer1 104 then initiates a link establishment process, described herein below with respect to FIG. 4.

Peer1 104 has a keepAlive timer 232 with Peer2 106. Peer2 also has a keepAlive timer 242 with Peer1 106. As described hereinabove, the keepAlive timers are wait timers used to ensure that a valid link is maintained between the Peers 104, 106. As the timer reaches a predetermined value, the Peer 104, 106, respectively, sends a keepAlive message in order to verify the data communication link with the other Peer 106, 104, respectively, is still active. The keepAlive timer 232 is set to a range of fifteen to forty-five seconds and counts down to zero seconds. If the keepAlive timer expires 232, Peer1 106 sends a keepAlive 234 to Peer2 106. When Peer2 receives the keepAlive message 234 from Peer1 104, Peer2 106 resets its keepAlive timer 242 to zero. Then, Peer2 106 sends a keepAliveACK 246 to Peer1 104. As described hereinabove, the keepAliveACK is a signal sent by Peer2 106 to Peer1 104 acknowledging that Peer2 106 has received the keepAlive message 234 from Peer1 104. When Peer1 104 receives the keepAliveACK 246, Peer1 104 resets its keepAlive timer 236 to the previously set value in the range of fifteen to forty-five seconds. If Peer2 106 does not receive the keepAlive 234 prior to Peer2's keepAlive timer expiring 242, then Peer2 106 would send a keepAlive (not shown) to Peer1 104. In that case Peer1 104 would respond with a keepAliveAck 246. The sending of keepAlive 234 from Peer1 104 to Peer2 106 maintains an open port between Peer1 104 and Peer2 106. As such, Peer1 104 and Peer2 106 are able to communicate voice packets via the open port.

The Peer ID Map ("The Map")

Referring now to FIG. 3a, an exemplary P2P Map 300 is shown. The Map, referenced as a peerIDPeerAddressMap, 300 comprises fields for Peer IDs 302, Source IP addresses 304, and Port addresses 306. When the Intermediary 102 receives the keepAlive 204, 214 from a Peer 104, 106, the Intermediary 102 updates the Map 300. The Peer ID 302 can be an ASCII string or number that identifies the name, location, or other identifier of the Peer 104, 106. The Map 300 further comprises a number of rows 308 at least equal to the number of Peers 104, 106 connected to the P2P network 100 times the number of ports which must be open between any given peer. As stated hereinabove, the Map 300 includes an entry for every occurrence of a unique Peer ID, IP address and port.

The keepAlive 204, 214 includes the following pieces of information which are entered into the Map 300:
Source peer ID 302 (ASCII String); and
Source IP Address 304 and Port Number 306.

As stated with respect to FIG. 1 hereinabove, the Intermediary 102 differs from the Peers 104, 106. The Intermediary 102 may be connected directly to the internet 110 and not connected via a firewall/NAT. Therefore, the Intermediary 102 can receive packets from any peer in the network which may be behind a firewall/NAT.

Table 1 contains an example Map 300. Assuming that each Peer 104, 106 must maintain two open ports with each other Peer 106, 104; then table 1 illustrates and exemplary peerIDPeerAddressMap 300 that supports this configuration.

TABLE 1

| Example peerIDPeerAddressMap | | |
|---|---|---|
| peerID | peerAddress | peerPort |
| Peer1 | a.b.c.d | 28564 |
| Peer1 | a.b.c.d | 28565 |
| Peer2 | e.f.g.h | 29754 |
| Peer2 | e.f.g.h | 29755 |
| Peer3 | i.j.k.l | 24987 |
| Peer3 | i.j.k.l | 24988 |

When a Peer seeks to join the P2P network 100 and is successfully allowed by the Intermediary 102 to initiate the link establishment process, the Intermediary 102 enters the peer's source ID, IP address and port into the Map 300. The Intermediary 102 maintains the Map 300 by requiring all Peers 104, 106 to keep an active link with the Intermediary 102. The Peers 104, 106 must send keepAlives 204, 214 to stay on the Map 300. If a keepAlive 204, 214 is not received by the Intermediary 102, after a specified amount of time, the Intermediary 102 deletes the corresponding Peer 104, 106 from the Map 300. The Intermediary 102 updates the Map 300 using the received keepAlives 204, 214. For example, if Peer1 104 uses a new port to send keepAlive 204, the Intermediary 102 updates the corresponding Source Port field 306 in the Map 300 with the new port number.

Link Establishment—Peer Joins P2P Network

Figure 4:
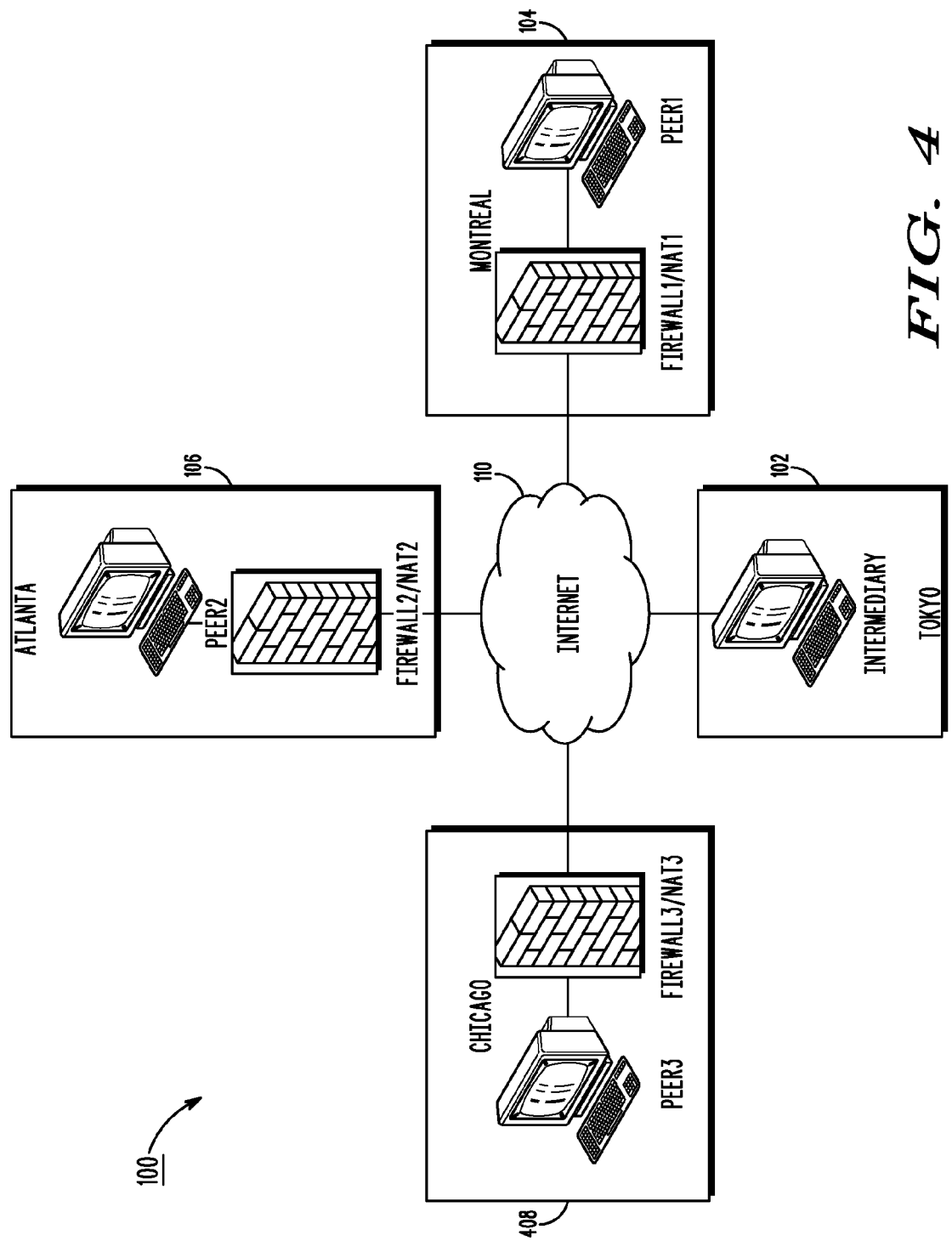
FIG. 4 is example of a process for a prospective peer linking to the P2P topology in accordance with some embodiments of the invention.

Referring now to FIG. 4, an example of a prospective peer linking to the P2P topology is shown. A prospective peer, Peer3 408 seeks to join the P2P network 100. Peer3 can be a new peer attempting to join the P2P network 100 for the first time or it can be a peer, previously joined and then disconnected, seeking to rejoin the P2P network 100. For example, when Peer1 104 boots up, Peer1 104 seeks to rejoin the P2P network 100 or ensure it is connected to all peers available in the P2P network 100, e.g., to the Intermediary 102 and Peer2 106. Peer1 104 contacts the Intermediary 102 to initiate a link. The steps performed by Peer1 104 and signals (messages) sent by Peer1 104 are the same steps and signals sent by any Peer 104, 106 or prospective peer (e.g., Peer3 408) to connect to the P2P network 100 as described with respect to FIG. 5 herein below.

When Peer3 408 boots up, Peer3 408 proceeds to join the P2P network 100. The Intermediary 102 is the first point of contact for Peer3 408. Peer3 408 has stored the Intermediary's 102 address and port number (referred to as "P2I_IntermediaryAddressPort") to which Peer3 408 must contact to start the link establishment procedure. The P2I_IntermediaryAddressPort is provisioned in each prototype peer.

Figure 5:
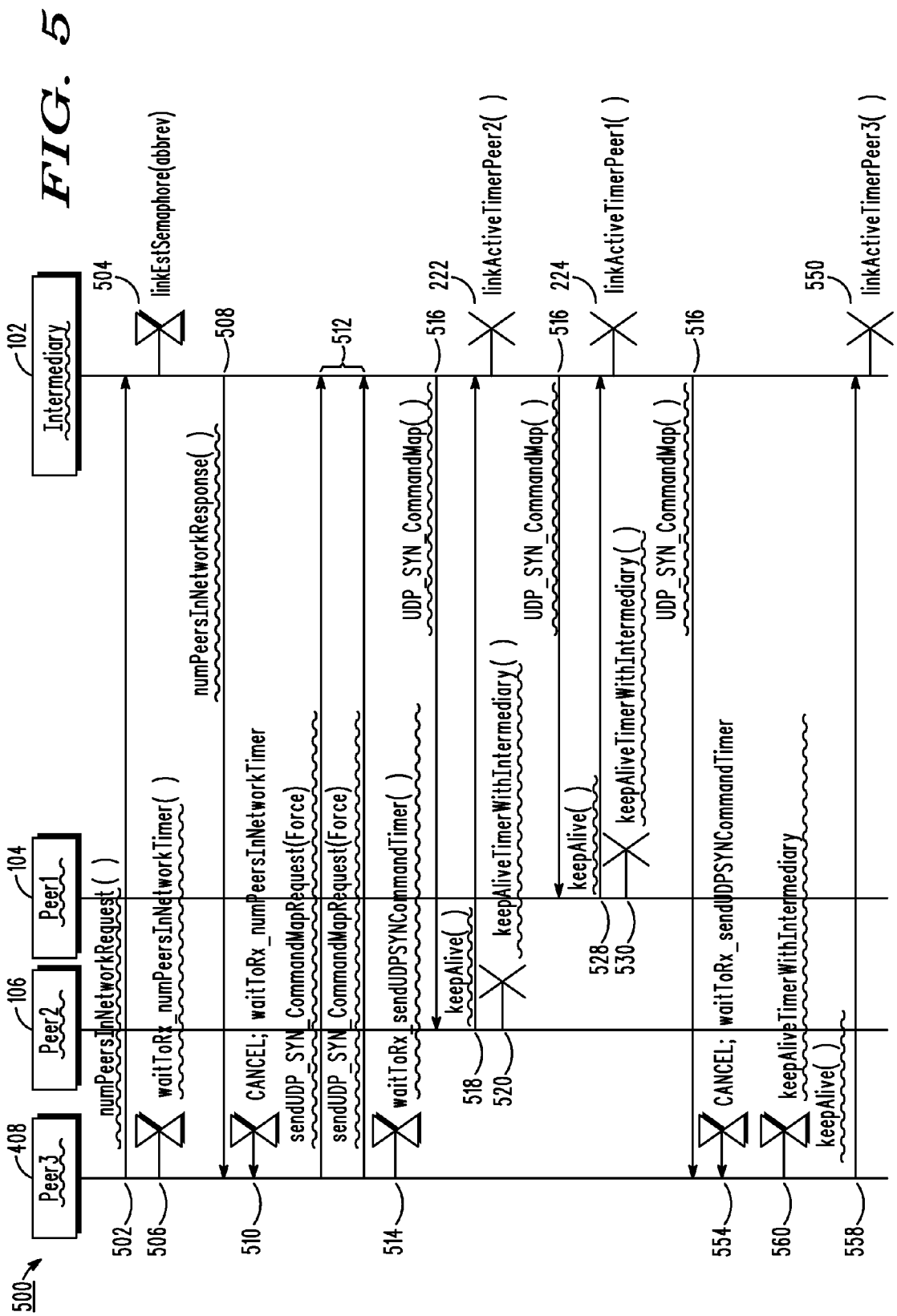
FIG. 5 is an example of a message sequence chart for linking peers in accordance with some embodiments of the invention.

FIG. 5 illustrates a message sequence chart for linking peers. Peer3 408 begins the link establishment 500 procedure by sending a message packet requesting the number of peers that are in the P2P network 100. The message packet, referenced as "numPeersInNetworkRequest," is a request sent to the Intermediary 102. Peer3 408 needs to know how many peers are available for linking. Therefore, Peer3 408 seeks to know, from the Intermediary 102, how many peers are in the P2P network 100. The numPeersInNetworkRequest 502 is a message packet that asks the Intermediary 102 to respond with the number of peers in the P2P network 100.

In order for Peer3 408 to be able to initiate the numPeersInNetworkRequest 502, the P2I_IntermediaryAddressPort is:
- Statically defined in the Intermediary 102; and
- Open on the Intermediary's 102 firewall, if the Intermediary 102 has a firewall, because the Intermediary 102 must always be available to receive packets from any peer (e.g., receive Peer3's 408 numPeersInNetworkRequest 502).

The Intermediary 102 initiates the process of establishing connections between the Peers 104, 106, 408 if no other link establishment process is currently active. Rephrasing, the Intermediary 102 responds only to one peer's (e.g., Peer3's 408) request to update or establish connections at a time. The Intermediary 102 may not run two or more such linking processes concurrently. Therefore upon receiving the request 502 from Peer3 408 to connect or update its connections to the other Peers 104, 106, the Intermediary 102 sets a semaphore (i.e. a protected variable or flag referenced as a linkEstablishmentSemaphore_Intermediary) 504 to busy. When the semaphore 504 is set to busy, the Intermediary 102 will not accept a request from a prospective peer, or previously linked peer, to link to the P2P network 100. The Intermediary 102 sends commands on behest of Peer3 408 and ignores all other requests until a semaphore timer (not shown) has expired. The semaphore timer is a timer that established a period that the Intermediary 102 will not receive requests from other peers. The semaphore timer is set to 15 seconds and counts down to zero. The semaphore timer cannot be set to any other value once the timer starts; the semaphore timer must expire before being reset i.e. the semaphore timer is unalterable by any process in the link establishment 500 state machine once the semaphore timer starts. Once the semaphore timer expires, the semaphore 504 is released (transitioned from busy to unbusy). The semaphore 504 and semaphore timer serve two functions:
1. The semaphore 504 allows only one link establishment process to run at a time.
2. The semaphore timer allows time for responses to be received by the Intermediary 102 from all of the other Peers 104, 106 in the P2P network 100.

Initiating a link request by a prospective peer (also known as "queuing") without a semaphore 504 would require additional timers and states in the state machine. An additional timer would be required in Peer3 408 to wait and determine whether the Intermediary 102 has queued the numPeersInNetworkRequest 502 or whether the Intermediary 102 has gone off line. What is currently a semaphore timer would still exist and would be re-termed; this latter timer is needed in the Intermediary 102 to wait for keepAlive message responses from all the Peers 104, 106, 408.

Peer3 408 sets a wait timer 506 to be used to establish a waiting period for Peer3 408 to wait to receive a response to the numPeersInNetworkRequest 502 that was sent to the Intermediary 102. The timer, referenced as waitToRx_numPeersInNetworkTimer 506, is set to ten seconds and counts down to zero seconds. The waitToRx_numPeersInNetworkTimer 506 is set to ten seconds to allow for:
- the numPeersInNetworkRequest 502 to traverse the internet 110 from Peer3 408 to the Intermediary 102;
- the Intermediary 102 to process the numPeersInNetworkRequest 502; and
- time for a response signal (i.e., message packet) containing the number of peers in the P2P network 100, called a numPeersInNetworkResponse, 508 to traverse the internet 110 from the Intermediary 102 to Peer3 408.

If the waitToRx_numPeersInNetworkTimer 506 expires, Peer3 408 sends another numPeersInNetworkRequest 502 to the Intermediary 102. The numPeersInNetworkRequest 502 sent by Peer3 408 contains the peer ID for Peer3 408. Peer3 408 resets the waitToRx_numPeersInNetworkTimer 506 to ten seconds.

There are several reasons Peer3 408 may not receive a response from the Intermediary 102. The communication line between Peer3 408 and internet 110 may be inoperable. The communication line between the Intermediary 102 and internet 110 may be inoperable. The Intermediary 102 may be offline. The semaphore (linkEstablishmentSemaphore_Intermediary) 504 may be set to busy.

When the Intermediary 102 receives the numPeersInNetworkRequest 502, the Intermediary 102 counts the number of rows 308 in the Map 300. The Intermediary 102 responds with a message packet, referenced as a numPeersInNetworkResponse, 508. The numPeersInNetworkResponse 508 message includes the number of peers in the P2P network 100. The numPeersInNetworkResponse 508 message also includes the number of ports that must be opened between peers in the P2P network 100. The numPeersInNetworkResponse 508 can have any positive integer value, including zero. When Peer3 408 receives the numPeersInNetworkResponse 508, Peer3 408 cancels the waitToRx_numPeersInNetworkTimer 510.

If the numPeersInNetworkResponse 508 is zero, it can be assumed that no other peers have attempted to contact the Intermediary 102 since the Intermediary 102 last powered up. In other words, it can be safely assumed that Peer 104, 106 are not part of the P2P network 100. Therefore Peer3 408 transitions to the maintain the link with the Intermediary 102 state as described in FIG. 2 (called a state S3:keepAliveTimerWithIntermediary). Peer3 408 resets the keepAliveTimerWithIntermediary 202 to fifteen seconds. If the number of ports that must be opened between Peers is more than one (e.g. the value numPortsOpenBetweenPeers>1), Peer3 408 must send a number of keepAlive 204 message packets to the Intermediary 102. The number of keepAlive 204 messages that is sent by Peer3 408 is equal to the number of ports that are to be opened between peers. Therefore, the number of keepAlives 204 that is sent to the Intermediary 102 is numPortsOpenBetweenPeers keepAlives 204. For example, if the number of ports that must be opened is two, Peer3 408 sends two keepAlives 102 to the Intermediary 102. If the number of ports that must be opened is five, Peer3 408 sends five keepAlives 102 to the Intermediary 102. Each keepAlive 102 includes Peer3's 408 peer ID. The peer ID is entered in the Map 300. NULL values may be entered in the peerAddress 304 and peerPort 306 column of the Map 300. The peerAddress 304 and peerPort 306 column are updated by the Intermediary 102 when Peer3 408 sends keepAlives to the Intermediary 102 in response to receiving a numPeersInNetworkResponse 508.

If the numPeersInNetworkResponse 508 received by Peer3 408 is more than "0", it can be safely assumed that the Intermediary 102 shall now allow Peer3 to initiate the Link Establishment processes with the peers in the P2P network 100. Peer3 408 sends a number of Command Map request signals (message packets) 512 to the Intermediary 102 requesting a Command Map 516. The map request signals 512 are called sendUDP_SYN_CommandMapRequests 512. The number of sendUDP_SYN_CommandMapRequest 512 messages sent is based on the following:
(duplicateNumSent)×(numPortsOpenBetweenPeers)× (numPeersInNetworkResponse)

where duplicateNumSent is a value that accounts for network loss;
numPortsOpenBetweenPeers is the number of ports that is to be opened between peers;
numPeersInNetworkResponse is the number of peers in the P2P network 100.

For example, the values may be:
duplicateNumSent=2
numPortsOpenBetweenPeers=2
numPeersInNetworkResponse=4

Peer3 408 sends eight sendUDP_SYN_CommandMapRequest 512 messages to the Intermediary 102. Peer3 408 sends each sendUDP_SYN_CommandMapRequest 512 from a unique port (i.e. eight different packets on eight different ports). Since the duplicateNumSent equals 2, a second sendUDP_SYN_CommandMapRequest 512 must be sent from each port to account for possible network loss. Therefore, on those same eight ports, one additional packet may be sent (for a total of sixteen packets) to account for possible packet drop on the internet 110. Peer3 408 sends sixteen sendUDP_SYN_CommandMapRequest 512 messages to the Intermediary 102. The Intermediary 102 maps each unique source IP Address/Port contained in these sendUDP_SYN_CommandMapRequests 512 to the IP Addresss/Port of the Peers 104, 106 already in the P2P network 100. The Intermediary 102 uses the unique source IP Address/Port of each sendUDP_SYN_CommandMapRequest 512 to build the Command Map 516 (referenced as UDP_SYN_CommandMap 516).

The sendUDP_SYN_CommandMapRequest 512 sent includes the peer ID for Peer3 408 and a "Force/Update" option. The peer ID is a unique string assigned to Peer3 408 at system provision time. In this embodiment, no two peers (e.g., Peer1 104, Peer2 106 and Peer3 408) have the same peer ID. The sendUDP_SYN_CommandMapRequest 512 also includes the sourceIP and sourcePort for Peer3 408. For example, the first and second sendUDP_SYN_CommandMapRequest 512 messages from Peer3 408 have the following sourceIP and sourcePort as read by the Intermediary 102:

249.239.54.123:58920
249.239.54.123:58921

The sendUDP_SYN_CommandMapRequest 512 includes either a "Force" or "Update" option. The Force option forces all other Peers 104, 106 in the P2P network 100 to establish or reestablish a link with Peer3 408. If a valid link is already established between Peer1 104 and Peer2 106 and the prospective Peer3 408, there still may be a need to reestablish the link between Peer1 104 and Peer2 106 because states in external firewalls and NAT's may have to be reset to a predetermined setting after Peer3 408 reboots. Peer3 408, which rebooted, may not be keeping state of which ports may or may not be open on external firewalls or NAT's.

After sending the Command Map request message with a force option (sendUDP_SYN_CommandRequest(Force)) 512, the option of the request is placed in Peer "3's" 408 memory (i.e. "Force" command is placed in memory). Peer3 408 sets a timer (waitToRx_sendUDPSYNCommandTimer) 514 establishing the period Peer3 408 will wait to receive the Command Map 516. Peer3 408 sets the waitToRx_sendUDPSYNCommandTimer 514 to ten seconds (⅔ of the time period that the_Semaphore Timer is set for). Setting the waitToRx_sendUDPSYNCommandTimer 514 to ten seconds allows for:

sendUDP_SYN_CommandMapRequest 512 to traverse the internet 110 from Peer3 408 to the Intermediary 102;
the Intermediary 102 to process the sendUDP_SYN_CommandRequest 512; and
time for a Command Map 516 to traverse the internet 110 from the Intermediary 102 back to Peer3 408.

The Update option requests all others in the P2P network 100 to ensure a valid link is established with Peer3 408. If a valid link is already established between the Peers 104, 106, 408, there is no need to reestablish the link. After sending the Command Map request signal with Update option (sendUDP_SYN_CommandRequest(Update)) 512, the option of the request is placed in Peer "3's" 408 memory (i.e. "Update" command placed in memory). Peer3 408 sets the waitForUDPSYNCommandTimer 514 to ten seconds (⅔ of the time that the Semaphore Timer is set for). The ten seconds allows for:

sendUDP_SYN_CommandMapRequest 512 to traverse the internet 110 from Peer3 408 to the Intermediary 102;
the Intermediary 102 to process the sendUDP_SYN_CommandRequest 512; and
time for a Command Map 516 to traverse the internet 110 from the Intermediary 102 back to Peer3 408.

The waitToRx_sendUDPSYNCommandTimer 514 is a wait timer used to wait for the Command Map 516 response from the Intermediary 102. There are several reasons Peer3 408 may not receive a response from the Intermediary 102:

The line between Peer3 408 and internet 110 may be inoperable;
The line between the Intermediary 102 and internet 110 may be inoperable;
The Intermediary 102 may be offline; and
The semaphore 504 may be busy.

If the waitToRx_sendUDPSYNCommandTimer 514 expires, Peer3 408 transitions back to the waitToRx_numPeersInNetworkTimer 506 state. Peer3 408 resends the numPeersInNetworkRequest 502 to the Intermediary 102 with the peer ID. Peer3 408 sets the waitToRx_numPeersInNetworkTimer 506 to ten seconds as described hereinabove. If the waitToRx_sendUDP_SYN_CommandRequests_Timer 514 expires before the minimum number of required sendUDP_SYN_CommandRequest 512 messages are received by the Intermediary 102 from the Peer3 408 (e.g., if the four sendUDP_SYN_CommandRequest 512 messages are not received) the semaphore timer is left to expire on its own resetting the semaphore 504 from busy to unbusy. The instantiation of this state machine then terminates.

When the Intermediary 102 receives the sendUDP_SYN_CommandMapRequest 512 from Peer3 408, the Intermediary 102 sends the Command Map 516 to Peer1 104 and Peer2 106. The Intermediary 102 sends a number of Command Maps 516. The number of Command Maps 516 sent is equal to the number of peers currently in the P2P network 100+1 times the number of ports that each peer must have open. Therefore, the Intermediary 102 sends one message packet for each port on Peer1 104, Peer2 106 and Peer3 408. For example, if the number of ports open between peers is two (numPortsOpenBetweenPeers=2) and the only peers on the P2P network 100 are Peer1 104 and Peer2 106, then the Intermediary 102 sends four Command Maps 516. The Intermediary 102 would send two Command Maps 516 to Peer1 104. The Intermediary 102 would also send two Command Maps 516 to Peer2 106. The Intermediary 102 also sends two Command Maps 516 to Peer3 408.

Figure 6:
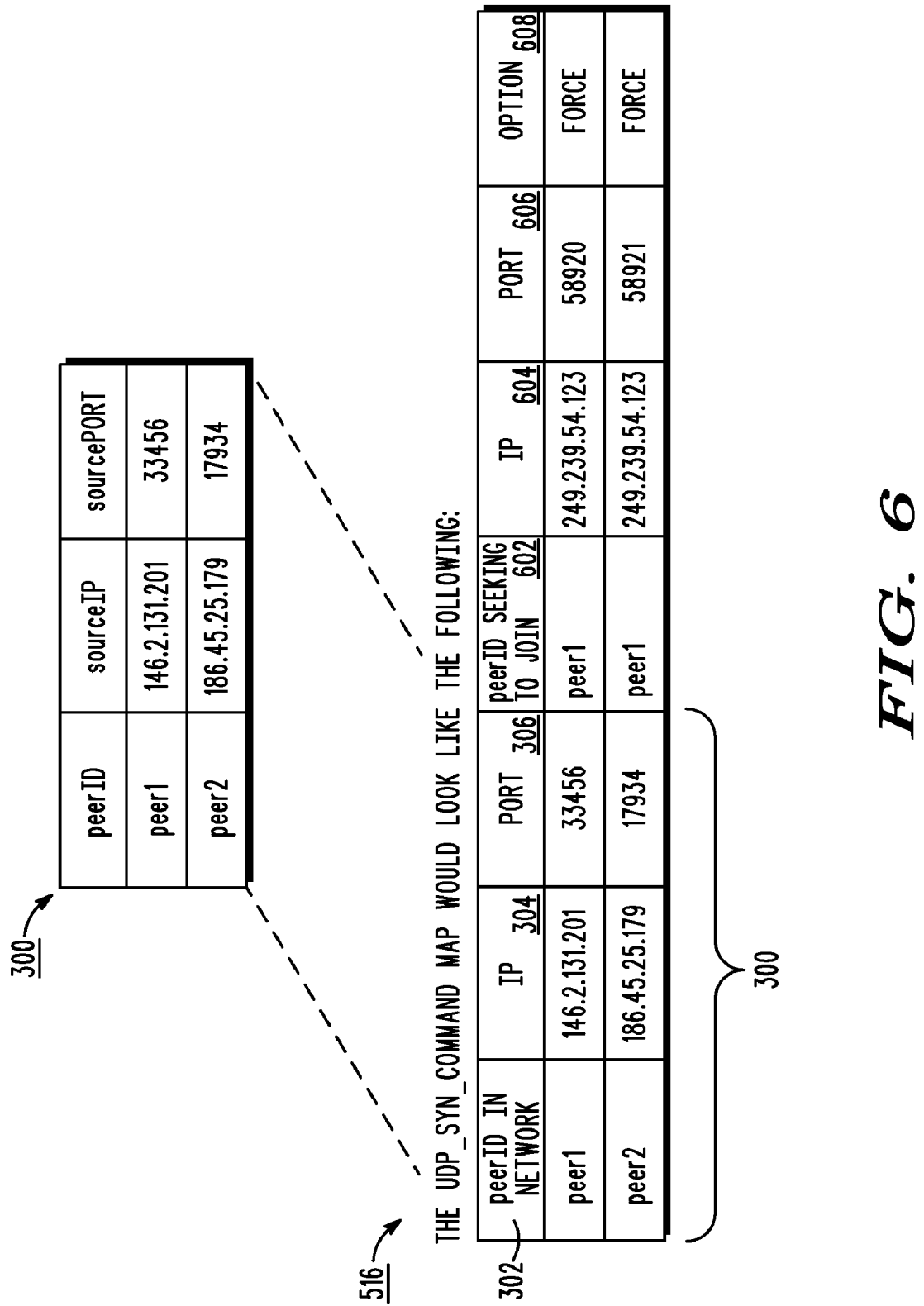
FIG. 6 is an exemplary UDP_SYN_CommandMap compared with the peer map in accordance with some embodiments of the invention.

FIG. 6 illustrates an exemplary Command Map 516. The first three columns of the Command Map 516 correspond to the Map 300 (peerIDPeerAddressMap 300 described with respect to FIGS. 3a and 3b and Table 1). Therefore, the first three columns of the Command Map 516 are rows that have the peer ID, IP address and Port for Peer3 408. The peer ID Seeking column 602, the IP column 604, and the Port column 606 are populated from the sendUDP_SYN_CommandRequest 512. The Option column comes directly from the sendUDP_SYN_CommandMapRequest 512 ("Force" or "Update") which was sent to the Intermediary 102. For example, the SourceIP, SourcePort, and Force option included in sendUDP_SYN_CommandMapRequest 512 messages from Peer3 408 can be:

249.239.54.123:58920 (Force)
249.239.54.123:58921 (Force)

This sourceIP, sourcePort, and option in the sendUDP_SYN_CommandMapRequest 512 messages from Peer3 408 are placed in the respective IP 604, Port 606, and Option 608 columns of the Command Map 516.

When Peer1 104 receives a Command Map 516, Peer1 104 identifies the joiningPeerID 602 associated with the "Force" option 608. Peer1 104 reads the joiningPeerID 602. If Peer1 104 recognizes that a link already exists with Peer3 408, Peer1 104 terminates the link with Peer3 408. To terminate the link, Peer1 104 extinguishes the instances of a P2P-Peer link state machines associated with Peer "3's" 408 joiningPeerID 602 (i.e. a SM3_LinkEstablishment-P2P-Peer state machines which are maintaining a links with IP addresses/ports belonging to the peer ID for Peer3 408). The P2P-Peer link state machine is a state machine that establishes and maintains a link between Peer1 104 and Peer3 408. The P2P-Peer link state machine establishes and maintains the link through the sending of messages and the receiving of responses (described herein below with respect to FIG. 7) by Peer1 104. Peer1 104 then accepts a new link with Peer3 408. New instances of a P2P-Peer link state machine (hereinafter a "SM3_LinkEstablishment-P2P-Peer") are instantiated. For example, if Peer1 104 has a SM3_LinkEstablishment-P2P-Peer state machine running and dedicated to a port with Peer3 408, Peer1 104 shall terminate that particular SM3_LinkEstablishment-P2P-Peer state machine and free up resources (e.g. Peer1 104 shall free up that former port number to be made available for a later connection to Peer3 408 or another prospective peer).

For each joiningPeerID 602 associated with the "Update" option 608, an instance of the state machine SM3_LinkEstablishment-P2P-Peer shall be instantiated with which Peer1 104 currently does not have a link established. If a link has been established (i.e. a link with Peer3 408 is currently active), Peer1 104 shall take no action. If a link has not been established, Peer1 104 and Peer3 408 establish a link as described herein below with respect to FIGS. 5 and 7.

When Peer2 106 receives a Command Map 516, Peer2 106 identifies the joiningPeerID 602 associated with the "Force" option 608. Peer2 106 reads the joiningPeerID 602. If Peer "2" 106 recognizes that a link already exists with Peer3 408, Peer2 106 terminates the link with Peer3 408. To terminate the link, Peer2 106 extinguishes the instances of the state machines associated with Peer "3's" 408 joiningPeerID 602 (i.e. a SM3_LinkEstablishment-P2P-Peer state machines which are maintaining a links with IP addresses/ports belonging to the peer ID for Peer3 408). Peer2 106 then accepts a new link with Peer3 408. New instances of the state machine SM3_LinkEstablishment-P2P-Peer are instantiated. For example, if Peer2 106 has a SM3_LinkEstablishment-P2P-Peer state machine running and dedicated to a port with Peer3 408, Peer1 104 shall terminate that particular SM3_LinkEstablishment-P2P-Peer state machine and free up resources (e.g. Peer2 106 shall free up that former port number to be made available for a later connection to Peer3 408 or another prospective peer).

For each joiningPeerID 602 associated with the "Update" option 608, an instance of the state machine SM3_LinkEstablishment-P2P-Peer shall be instantiated with which Peer2 106 currently doesn't have a link established. If a link has been established (i.e. a link with Peer3 408 is currently active), Peer2 106 shall take no action. If a link has not been established, Peer2 106 and Peer3 408 establish a link as described herein below with respect to FIGS. 5 and 7.

Referring back to FIG. 5; when Peer1 104 determines that a link with Peer3 408 can be established, as directed by the Force/Update option 608 described with respect to FIGS. 5 and 6 hereinabove, Peer1 104 reads the number of open port between peers (numPortsOpenBetweenPeers) requirement and opens the required number of new ports to link with Peer3 408. Peer1 104 then sends a keepAlive 518 to the Intermediary 102. Peer1 104 sends keepAlives 518 for every open port required by the P2P network 100. For example, if the Peers 104, 106 in the P2P network 100 are required to have two open ports, Peer1 104 sends two keepAlives 518 to the Intermediary 102. Peer1 104 then resets the keepAlive timer 520 to its previous value of fifteen to forty-five seconds.

As with Peer1 104 above, when Peer2 106 determines that a link with Peer3 408 can be established, as directed by the Force/Update option 608 described with respect to FIGS. 5 and 6 hereinabove, Peer2 106 reads the numPortsOpenBetweenPeers requirement and opens the required number of new ports to link with Peer3 408. Peer2 106 then sends a keepAlive 528 to the Intermediary 102. Peer "2" 106 sends keepAlives 528 for every open port required by the P2P network 100. For example, if the Peers 104, 106 in the P2P network 100 are required to have two open ports, Peer2 106 sends two keepAlives 528 to the Intermediary 102. Peer2 106 then resets the keepAlive timer 530 to its previous value of fifteen to forty-five seconds.

The Intermediary 102 receives the keepAlives 518, 528 from Peer1 104 and Peer2 106 respectively. The keepAlive 518, 528 messages to the Intermediary 102 include the new source port numbers that Peer1 104 and Peer2 106 have opened for linking with Peer3 408. The keepAlives's 518, 528 include the peer ID. A series of duplicate keepAlives 518, 528 equal to a duplicateNumSent are also sent by Peer1 104 and Peer2 to account for possible packet drop. The Intermediary 102 resets the linkActive timers 222, 224 to zero. The Intermediary 102 then sends the Command Map 516 to Peer3 408. The Intermediary 102 also uses Command Map 516 to update the Map 300 (as described herein below in the section "Updating the peerIDPeerAddressMap"). The updated Map 300 includes the new ports for Peer1 104 and Peer2 106 as well as the peerID, sourceIP, and sourcePort information for Peer3 408. The Intermediary 102 then ends the semaphore 550.

Thus, the semaphore timer is set long enough to allow time for:

Peer3 408 to receive the numPeersInNetworkResponse from the Intermediary 102;
  Peer3 408 to send multiple sendUDP_SYN_CommandRequest 512 messages to the Intermediary 102 and be received by the Intermediary 102;
  The Intermediary 102 to construct and send the Command Map 516 to the Peers 104, 106 in the network 100;
  The Peers 104, 106 to receive the Command Map 516 and establish connections with the Peer3 408;
  Peer1 104 and Peer2 106, upon receiving a Command Map 516, to send the requisite number of keepAlive(s) with a new source port number; and
  For the Intermediary 102 to use the source port number(s) to update the peerIDPeerAddressMap 300.

Peer3 408 receives the Command Map 516 from the Intermediary 102. Peer3 408, upon receiving the Command Map 516, cancels 554 the waitToRx_sendUDPSYNCommand-Timer 514. Peer3 408 then sends a keepAlive 558 to the Intermediary 102. Peer3 408 sends the keepAlive 558 from every port that is required to be open. For example, if the number of open ports between peers equals 2 (numPorts-OpenBetweenPeers=2), then Peer3 408 sends a total of two keepAlives 558, e.g., one keepAlive 558 from each port. Peer3 408 sends duplicate keepAlives 558 from each port equal to the duplicateNumSent. The duplicate keepAlives 558 are redundant to account for possible packet drop. Peer3 408 sets a KeepAliveTimer 560. The keepAliveTimer 560 is set to a range of fifteen to forty-five seconds and counts down to zero.

Updating the peerIDPeerAddressMap

Referring back to FIGS. 3, 5 and 6, upon receiving the keepAlives 518, 528, 558, the Intermediary 102 updates the peerIDPeerAddressMap 300. As described hereinabove, each keepAlive 518, 528 include a peerID 302, sourceIP 304, and sourcePort 306 value. The peerID 302 is the name of the Peer 104, 106. The soureIP 304 is the IP address of the peer. The sourcePort 306 is the port the Peer 104, 106 used to send the keepAlive 518, 528. The sourcePort 306 is also the port that the Peer 104, 106 is opening for use for link establishment 500. Upon receiving the Command Map 516, Peer1 104, Peer2 106, Peer3 408 send in a keepAlive 518, 528, 558 on a new, unused port. The Intermediary 102 extracts the sourcePort 306 values contained in each keepAlive 518, 528, 558. The Intermediary 102 places these values in the appropriate rows corresponding to Peers 104, 106, 408 in the Map 300. When the Map 300 is updated, the Intermediary 102 is prepared to create a new Command Map 516 for a new prospective Peer intending to join the network 100. The updated Map 300 serves as the basis for the Command Map 516. FIG. 3b illustrates the updated Map 300. The Intermediary 102 uses the Command Map 516 for future link establishment sequences. A Peer4 (not shown) may be the next prospective peer to join the P2P network 100. Peer4 seeks to establish a unique link with each Peer 104, 106, 408 in the network 100. The Intermediary 102 informs Peer4 what port(s) is/are available on each Peer 104, 106, 408 already in the network 100. The Intermediary 102 knows what port(s) is/are available on each Peer 104, 106, 408 in the network 100 by what is contained in the Command Map 516. As noted in reference to FIG. 6 hereinabove, the Command Map 516 was updated based on the latest source port number read on a keepAlive 518, 528, 558 received from each Peer 104, 106, 408 in the network 100. Each new source port (read in the latest keepAlive 518, 528, 558 message) associated with each Peer 104, 106, 408 in the Map 300 (e.g. Peer1 104, Peer2 106, Peer3 408) is the available port to which the next prospective peer (e.g. Peer4—not shown) may connect.

The Intermediary 102 receives the new port number(s) during the time the semaphore 504 is set to busy. If the Intermediary 102 does not receive the new port numbers during that time, Peer4 shall not be informed by the Intermediary 102 to connect to valid, available port(s) on a Peer 104, 106, 408. The semaphore 504 disallows any additional prospective Peer, such as a Peer4 (not shown) from connecting to the network 100 until a minimum amount of time, as defined by the semaphore timer, has elapsed since the last Peer, e.g., Peer3 408, connected to the network 100. This semaphore 504 allows the Intermediary 102 time to receive the new available port numbers from each Peer 104, 106, 408.

For example, assume Peer1 104 and Peer2 106 were already connected and Peer3 408 just finished establishing links with Peer1 104 and Peer2 106. The Command Map 516 that was used to link Peer3 408 is illustrated in Table 2:

TABLE 2

UDP_SYN_CommandMap Indicating need for keepAlive Update

| peerID | peerAddress | peerPort | joiningPeerID | joiningPeer Address | joiningPeer Port | Option |
| --- | --- | --- | --- | --- | --- | --- |
| Peer1 | a.b.c.d | 33457 | Peer3 | i.j.k.l | 18000 | Force |
| Peer2 | e.f.g.h | 43328 | Peer3 | i.j.k.l | 18001 | Force |

Now Peer1 104, Peer2 106 and Peer3 408 must send in keepAlives 518, 528, 558 with new source port numbers prior to the semaphore timer expiring. Until the keepAlives 518, 528, 558 are sent from the Peers 104, 106, 408 to the Intermediary 102, the Map 300 in the Intermediary 102 could potentially have the ports 33457 and 43328 available to Peer4, the next peer intending to connect to the network. Use of these ports by Peer 4 would result in a port conflict. Port 33457 is a port on Peer1 104 dedicated to a link with Peer3 408; port 43328 is a port on Peer2 106 dedicated to a link with Peer3 104. Until the keepAlive 518 from Peer1 with the new port is received by the Intermediary 102, the Map 300 could potentially indicate Port 33457 is available for the Peer4 to connect with Peer1 106. It should be noted that the Intermediary 102 writes a NULL to the entire peerPort column of the Map 300 after preparing the Command Map 516 to prevent such an error from occurring. However the port update is still necessary. Until the keepAlive 528 from Peer2 106 with the new port is received by the Intermediary 102, the Map 300 could potentially indicate Port 43328 is available for Peer4 to connect with Peer2 106. As above, the Intermediary 102 writes a NULL to the entire peerPort column of the Map 300 after preparing the Command Map 516 to prevent such an error from occurring. Assuming Peer1 104, Peer2 106 and Peer3 408 sent in keepAlives 518, 528, 558 from UDP ports 28564, 29754, and 24987 respectively and the semaphore timer in the Intermediary 102 is set long enough allowing the Intermediary 102 to receive the keepAlives 518, 518, 558 from all Peers 104, 106, 408 in the network 100 after the Command Map 516 is sent out; then, the Map300 would reflect the correct available ports. If after the semaphore timer expired and the semaphore 504 set to unbusy, Peer4 sought to connect to the network 100 (Peer4 sent to the Intermediary 102 three sendUDP_SYN_CommandRequest(Force) packets with each of the three packets having a unique port number [assuming the P2P network 100 requires one port between peers—numPortsOpenBetweenPeers=1]); a Command Map 516 (resembling Table 2) can be built with newly available ports from Peer1 104, Peer2 106 and Peer3 408.

Peer to Peer Link Establishment

Figure 7A:
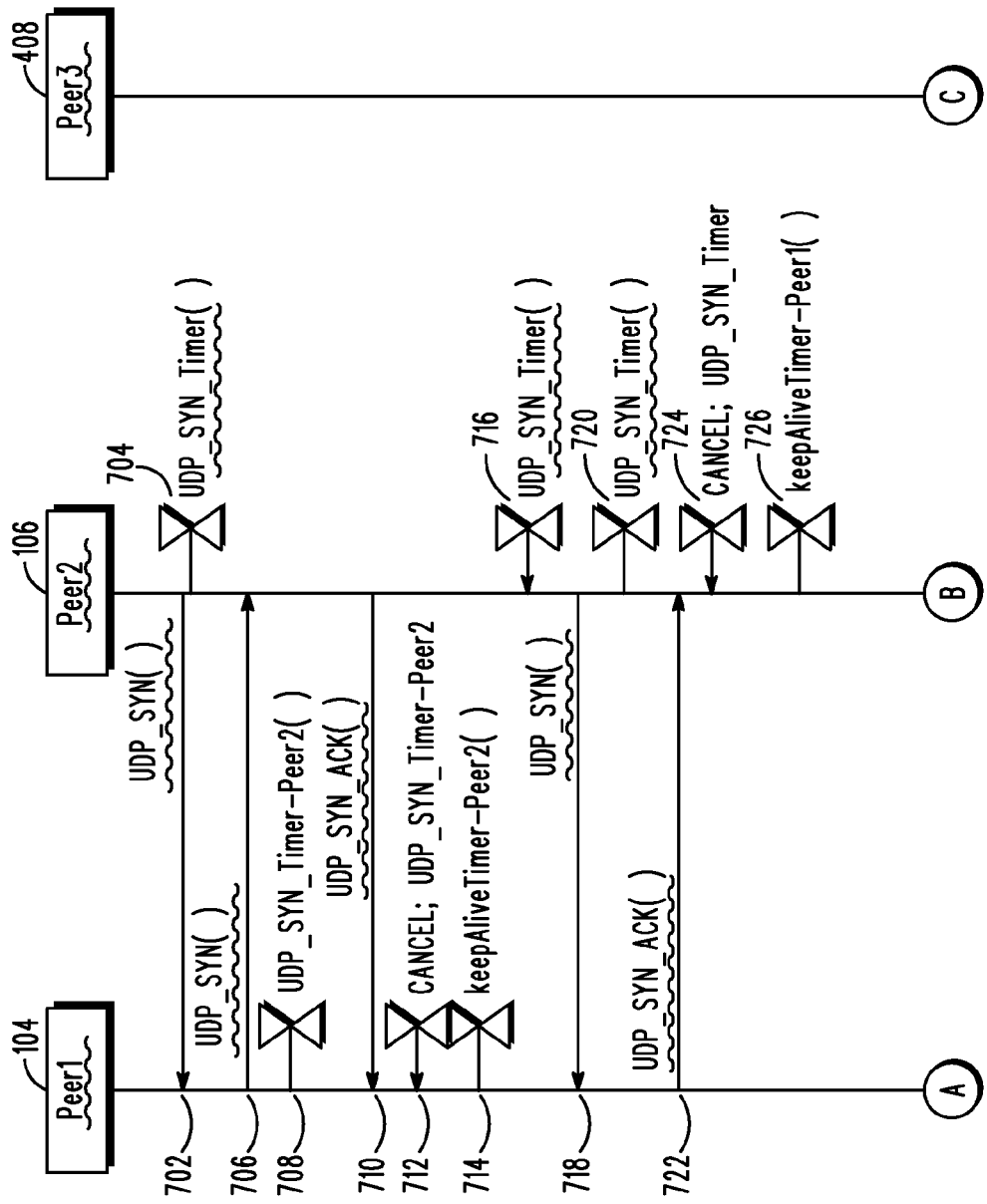
FIG. 7 is an exemplary message sequence for peers maintaining connection with other peers in accordance with some embodiments of the invention.
Figure 7B:
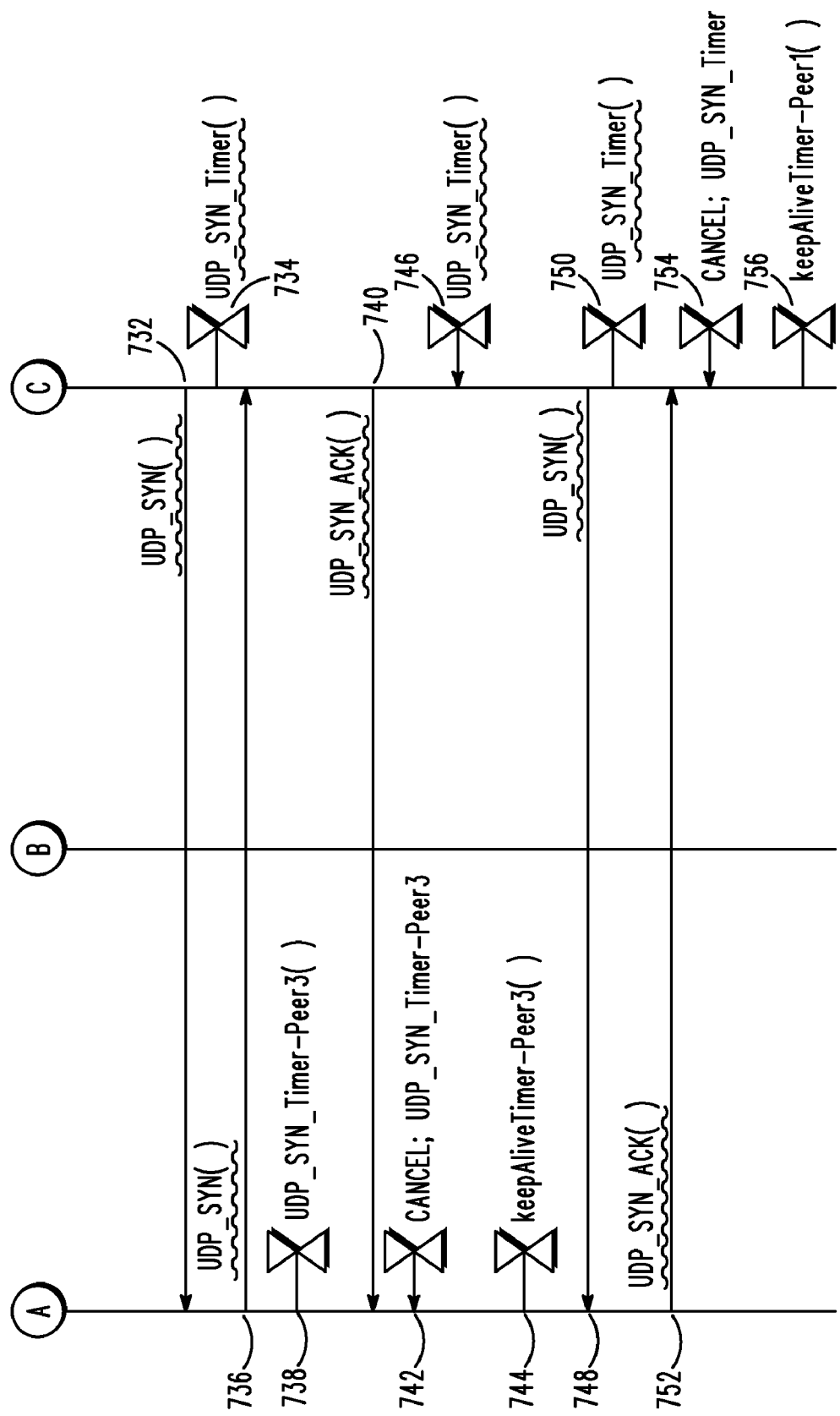

Referring now to FIG. 7, an example of a message sequence for peers maintaining connection with other peers is illustrated. The Peers 104, 106, 408 are linked with the Intermediary 102 through the network 110. The Peers 104, 106, 408 can be behind NATs. The Peers 104, 106, 408 may not be behind a symmetric NAT, such as a Full Cone Restricted, Cone/Port Restricted, and Cone NAT. The Peers 104, 106, 408 keep the same sourceIPs and sourcePorts as identified in the Map 300.

Peer2 106 sends a signal 702 (message packet) requesting a port be opened. Peer2 106 sends the open port request signal (hereinafter "UDP_SYN") 702 to Peer1 104. The UDP_SYN command is a small packet that is an "open Port" command word. Peer2 106 sets a wait timer (hereinafter "UDP_SYN_Timer") 704 used to establish a period Peer2 106 will wait for a reply to the UDP_SYN 702 message before sending another UDP_SYN 702. The UDP_SYN_Timer 704 can be set to two-hundred-fifty milliseconds. The NAT/firewall at Peer1 104 blocks the UDP_SYN 702. The NAT/firewall at Peer1 104 blocks the UDP_SYN 702 because there has been no prior communication between Peer1 104 and Peer2 106. Therefore, UDP_SYN 702 never reaches Peer1 104. Peer1 104 now sends a UDP_SYN 706 to Peer2 106. Peer1 104 sets a UDP_SYN_Timer 708. The UDP_SYN_Timer 708 can be set to two-hundred-fifty milliseconds. Since Peer2 106 previously sent a message to Peer1 104, the UDP_SYN 706 passes through the NAT/firewall of Peer2 106. Peer2 106 receives the UDP_SYN 706. Peer2 106 responds by sending a signal (message packet) 710 acknowledging receipt of the UDP_SYN 706. Peer2 106 sends the acknowledging signal 710 (hereinafter "UDP_SYN_ACK" 710) to Peer1 104. Peer1 104 cancels the UDP_SYN_Timer 712. Peer1 104 sets a keepAliveTimer-Peer2 714. The keepAliveTimer-Peer2 714 is a timer Peer1 104 uses to ensure a valid link is maintained with Peer2 106. The keepAliveTimer-Peer2 714 is set to a range of fifteen to forty-five seconds and counts down to zero seconds. The keepAliveTimer-Peer2 714 is set so that the port between Peer1 104 and Peer2 106 remains open.

Since the UDP_SYN 702 never reached Peer1 104, Peer1 104 never responded to Peer2 106. Peer2 106 is still waiting to receive a UDP_SYN_ACK from Peer1 104. The UDP_SYN_Timer 704 on Peer2 106 expires 716. Peer2 sends another UDP_SYN 718 to Peer1 104. Peer2 106 sets UDP_SYN_Timer 720 to two-hundred-fifty milliseconds. Since there is an open port between Peer1 104 and Peer2 106, Peer1 104 receives the UDP_SYN 718 from Peer2 106. Peer1 104 responds by sending a UDP_SYN_ACK 722 to Peer2 106. When Peer2 106 receives the UDP_SYN_ACK 722, Peer2 106 cancels the UDP_SYN_Timer 724 and sets the keepAliveTimer-Peer1 726. The keepAliveTimer-Peer1 726 is a timer Peer2 106 uses to ensure a valid link is maintained with Peer1 104. The keepAliveTimer-Peer1 726 is set to a range of fifteen to forty-five seconds and counts down to zero seconds. The keepAliveTimer-Peer1 726 is set so that the port between Peer1 104 and Peer2 106 remains open.

The same transactions can occur between Peer1 104 and Peer3 408. Peer3 408 sends a UDP_SYN 732 to Peer1 104. The UDP_SYN 732 is an "open Port" command word. Peer3 408 sets an UDP_SYN_Timer 734. The UDP_SYN_Timer 734 can be set to two-hundred-fifty milliseconds. The NAT/firewall at Peer1 104 blocks the UDP_SYN 732. The NAT/firewall at Peer1 104 blocks the UDP_SYN 732 because there has been no prior communication between Peer1 104 and Peer3 408. Therefore, UDP_SYN 732 never reaches Peer1 104. Peer1 104 now sends a UDP_SYN 736 to Peer3 408. Peer1 104 sets an UDP_SYN_Timer 738. The UDP_SYN_Timer 738 can be set to two-hundred-fifty milliseconds. Since Peer3 408 previously sent a message to Peer1 104, the UDP_SYN 736 passes through the NAT/firewall of Peer3 408. Peer3 408 receives the UDP_SYN 736. Peer3 408 responds by sending a UDP_SYN_ACK 740 to Peer1 104. Peer1 104 cancels the UDP_SYN_Timer 742. Peer1 104 sets a keepAliveTimer-Peer3 744. The keepAliveTimer-Peer3 744 is a timer Peer1 104 uses to ensure a valid link is maintained with Peer3 408. The keepAliveTimer-Peer3 744 is set to a range of fifteen to forty-five seconds and counts down to zero seconds. The keepAliveTimer-Peer3 744 is set so that the port between Peer1 104 and Peer3 408 remains open.

Since the UDP_SYN 732 never reached Peer1 104, Peer1 104 never responded to Peer3 408. Peer3 408 is still waiting to receive a UDP_SYN_ACK from Peer1 104. The UDP_SYN_Timer 734 on Peer3 408 expires 746. Peer3 408" sends another UDP_SYN 748 to Peer1 104. Peer3 408 sets UDP_SYN_Timer 750 to two-hundred-fifty milliseconds. Since there is an open port between Peer1 104 and Peer3 408, Peer1 104 receives the UDP_SYN 748 from Peer3 408. Peer1 104 responds by sending a UDP_SYN_ACK 752 to Peer3 408. When Peer3 408 receives the UDP_SYN_ACK 752, Peer3 408 cancels 754 the UDP_SYN_Timer 750 and sets the keepAliveTimer-Peer1 756. The keepAliveTimer-Peer1 756 is set to a range of fifteen to forty-five seconds and counts down to zero seconds. The keepAliveTimer-Peer1 756 is a timer Peer3 408 uses to ensure a valid link is maintained with Peer1 104. The keepAliveTimer-Peer1 756 is set so that the port between Peer3 408 and Peer1 104 remains open.

These transactions are exemplary. The order in which the Peers 104, 106, 408 connect with each other can vary. Any of the Peers 104, 106, 408 can be the first to initiate the process by sending the UDP_SYN command. Peer1 104 and Peer2 106 can send UDP_SYN commands to Peer3 408 at the same time. Peer2 106 can send the UDP_SYN command to Peer1 104 while Peer1 104 is sending the UDP_SYN command to Peer3 408. Peer3 408 can be responding to a UDP_SYN command from Peer1 104 when Peer3 408 receives a UDP_SYN command from Peer2 106. Peer3 408 will then also respond to the UDP_SYN command from Peer2 106. As such, the operations can occur concurrently or sequentially, or in any combination thereof. The UDP_SYN commands are small packets in a range of 60 bytes or less. Therefore, the process of the Peers 104, 106, 408 connecting to each other can occur very rapidly. As such, the UDP_SYN_Timers 704, 708, 714, 720, 726, 734, 738, 744, 750, 756 can be set to a range less than a second.

After the links are established, Peers 104, 106, 408 send keepAlives (not shown) to each other to keep the ports open. If Peer1 104, Peer2 106, or Peer3 determines that a link has failed, e.g., the keepAlives are not received, that peer (Peer1 104, Peer2 106, or Peer3 408) runs the link establishment steps outlined with respect to FIG. 7, with "Update" option, sequence with the Intermediary 102. For example, if Peer1 104 sends keepAlives to Peer2 106 and Peer3 408 but does not receive a certain number of keepAliveACK's back, Peer1 104 initiates the link establishment sequence.

Figure 8A:
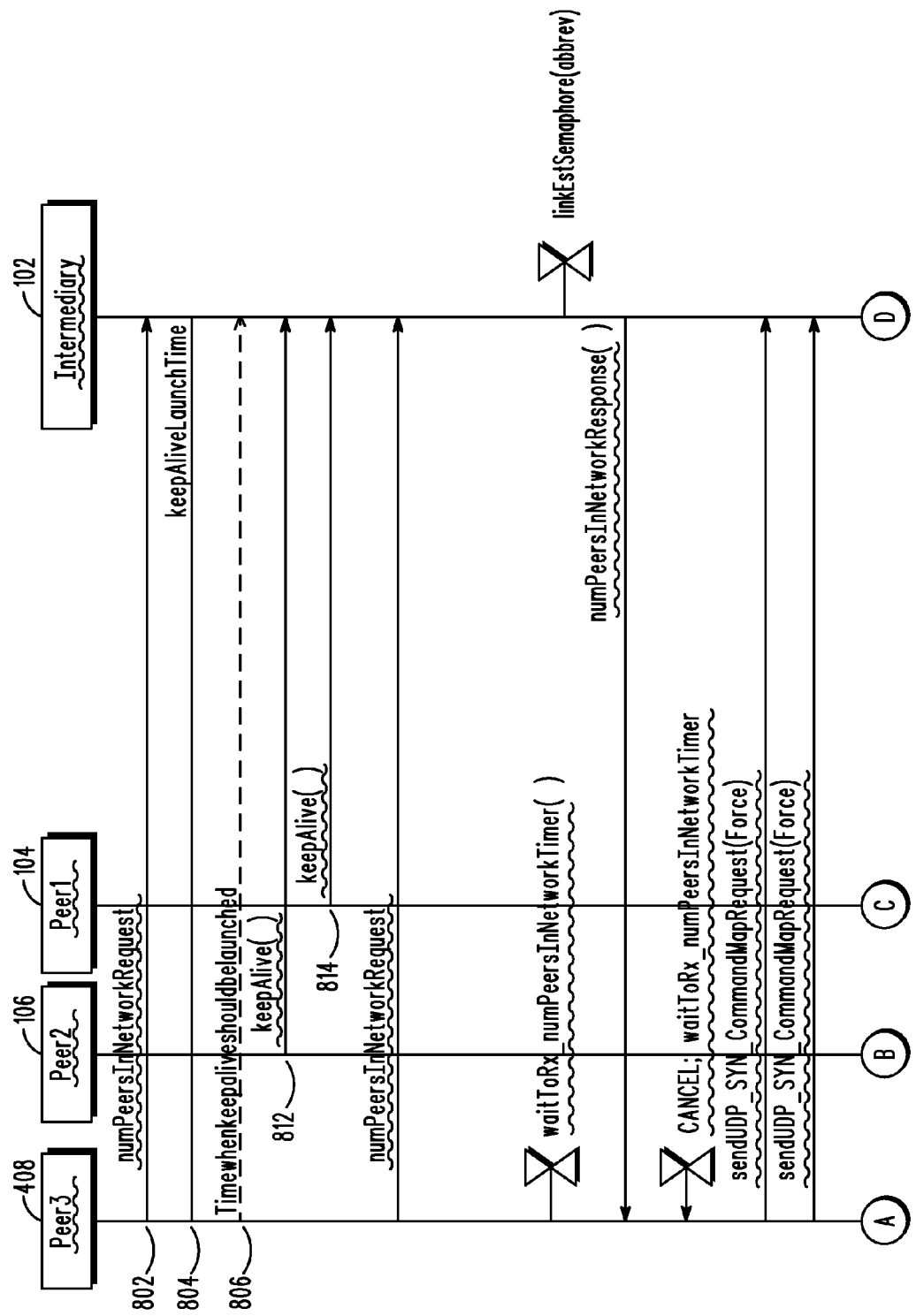
FIG. 8 is an example of a state diagram for simultaneous linking in accordance with some embodiments of the invention.
Figure 8B:
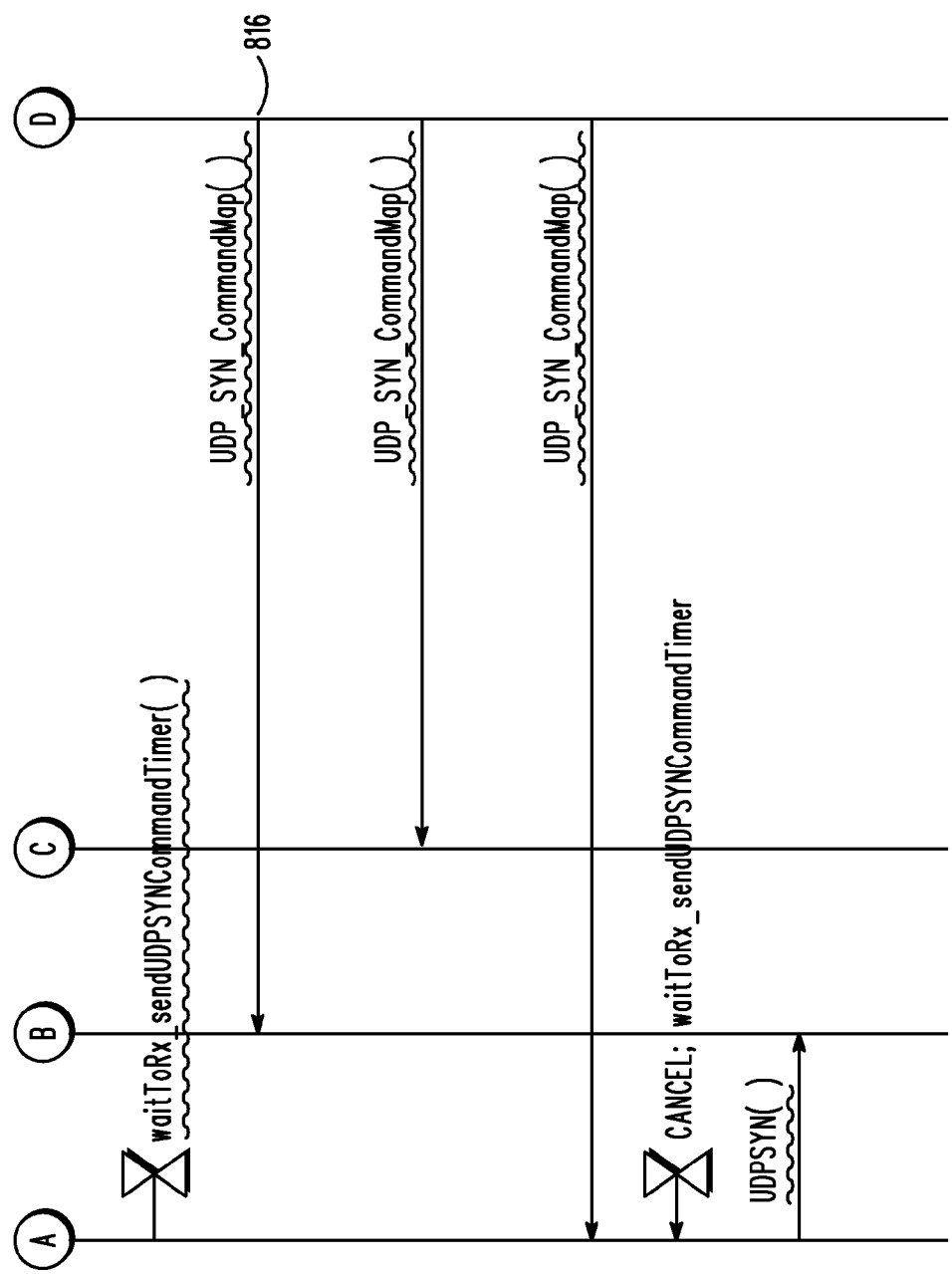

In an additional embodiment, the Intermediary 102 can bundle the requests from peers seeking to join the P2P network 100 as illustrated in FIG. 8. Upon receiving the numPeersInNetworkRequest 802, Intermediary 102 responds with a keepAliveLaunchTime 804. The keepAliveLaunchTime 804 is a signal (message packet or message) that defines the time when keepAlives should be launched. A launch time 806 would be, for example, keepAliveLaunchTime+thirty seconds. The launch time 806 is the next time a link establishment session will occur. The use of thirty seconds is exemplary. The launch time could be set to be anywhere in the range of thirty seconds to ten minutes. At the launch time 806, all Peers 104, 106 in P2P Network 100 send in keepAlives 812, 814. The Intermediary 102 uses the keepAlives 812, 814 to ensure that the Map 300 is up-to-date. The Intermediary 102 also uses the keepAlives 812, 814 to ensure that ports open on each Peer 104, 106 in the P2P Network 100.

The peers run the link establishment steps as described with respect to FIG. 7 hereinabove. However, it is not necessary for Peer1 104 and Peer2 106 to send keepAlives in response to receiving the Command Map 816. In the previous embodiment described with respect to FIGS. 5 and 6, Peer1 104 and Peer2 106 were required to send keepAlives 518, 528 to update the Command Map 516 (see FIG. 5). However, the keepAlives 812, 814 sent by Peer1 104 and Peer2 106 at launch time 806 are now used by the Intermediary 102 to update the Command Map 816. The Command Map 816 includes the next keepAliveLaunchTime 804. The launch time 804 is the time the next link establishment session will occur. The Intermediary 102 can simply queue link establishment requests until that time. As such, the linking of new prospective peers can be bundled to occur at discrete times.

Figure 9:
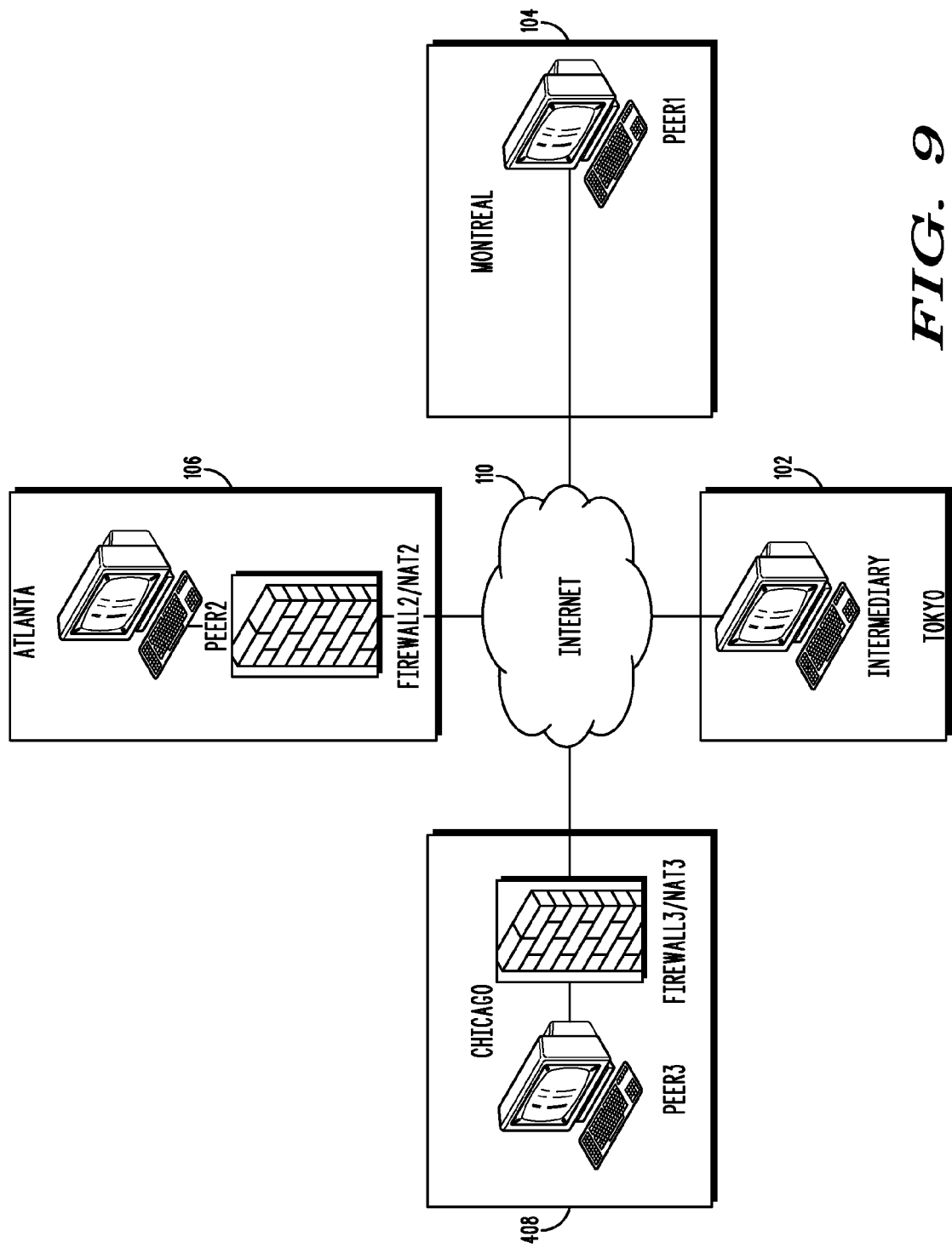
FIG. 9 is another example of a P2P topology in accordance with some embodiments of the invention.

Referring now to FIG. 9, another example of a P2P topology is illustrated. The P2P Network 100 comprises an Intermediary 102 and several Peers 104, 106, 108 data connected through a network 110. The Peers 104, 106, 408 and Intermediary 102 can be located at the same physical location, in different locations in the same city, in multiple different cities, in any combination thereof. Peer1 104 is connected directly to the network 110. Peer2 106 is connected to the network 110 via a NAT/firewall. Peer3 408 is connected to the network 110 via a NAT/firewall as well.

Figure 10:
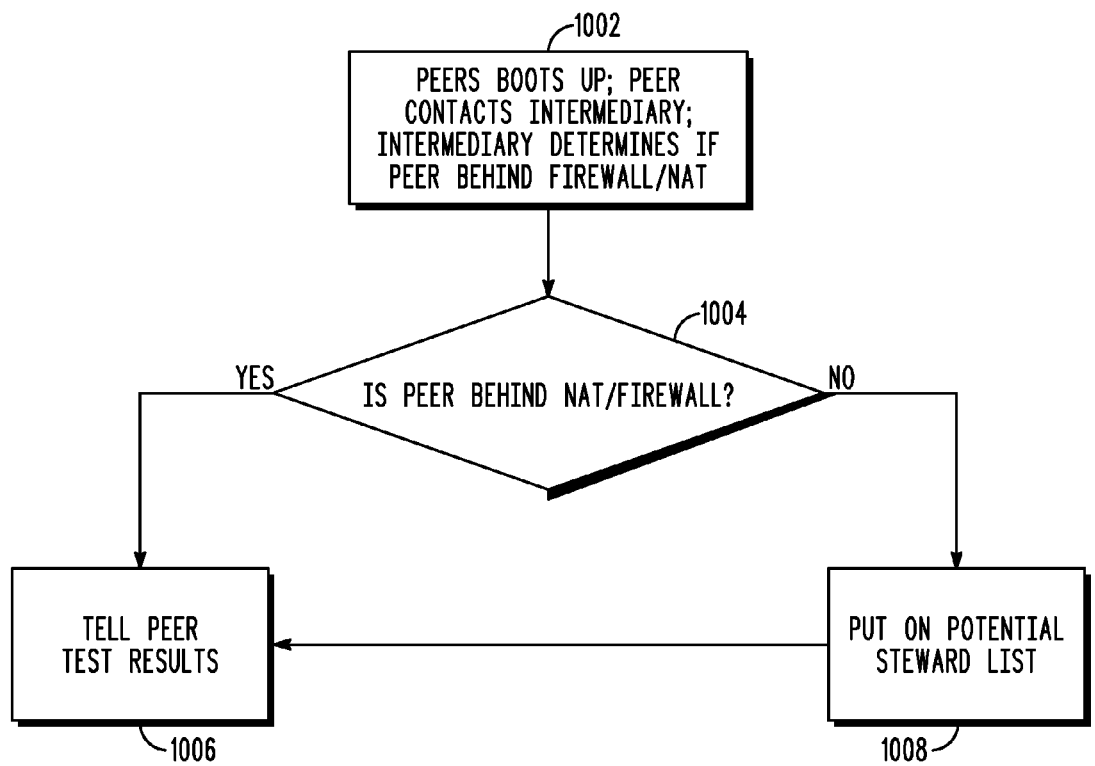
FIG. 10 is a flow chart for identifying Steward Peers in accordance with some embodiments of the invention.

Referring now to FIG. 10, an exemplary flow chart illustrating the designation of Steward Peers is illustrated. The Intermediary 102 determines whether the peers, Peer1 104, Peer2 106 and Peer3 408, are behind NAT/Firewalls or not. Peer2 106 boots up 1002 and starts the link establishment sequence, described with respect to FIGS. 2, 5, 7 and 8 hereinabove, with the Intermediary 102. During the link establishment sequence, the Intermediary 102 determines 1004 that Peer2 106 is behind a NAT/Firewall. The Intermediary 102 reports 1006 back to Peer2 106 that Peer2 106 is behind a device. Peer "3 408" boots up 1002 and starts the link establishment sequence, described hereinabove, with the Intermediary 102. During the link establishment sequence, the Intermediary 102 determines 1004 that Peer3 408 is behind a NAT/Firewall. The Intermediary 102 reports 1006 back to Peer3 408 that Peer3 408 is behind a device. Peer1 104 boots up 1002 and starts the link establishment sequence, described hereinabove, with the Intermediary 102. During the link establishment sequence, the Intermediary 102 determines 1004 that Peer1 104 is not behind a NAT/Firewall. The Intermediary 102 reports back to Peer1 104 that Peer1 104 is not behind a device. The Intermediary 102 places Peer1 104 on a potential Steward Peer List 1008. A Steward Peer (hereinafter "Steward") is a peer capable of performing the same functions as the Intermediary; such as receiving requests from prospective peers seeking to join the P2P network. The Intermediary 102 can then transfer some or the entire link establishment functions to Peer1 104. As a Steward, Peer1 104 can help with peer to peer media call control.

Figure 11:
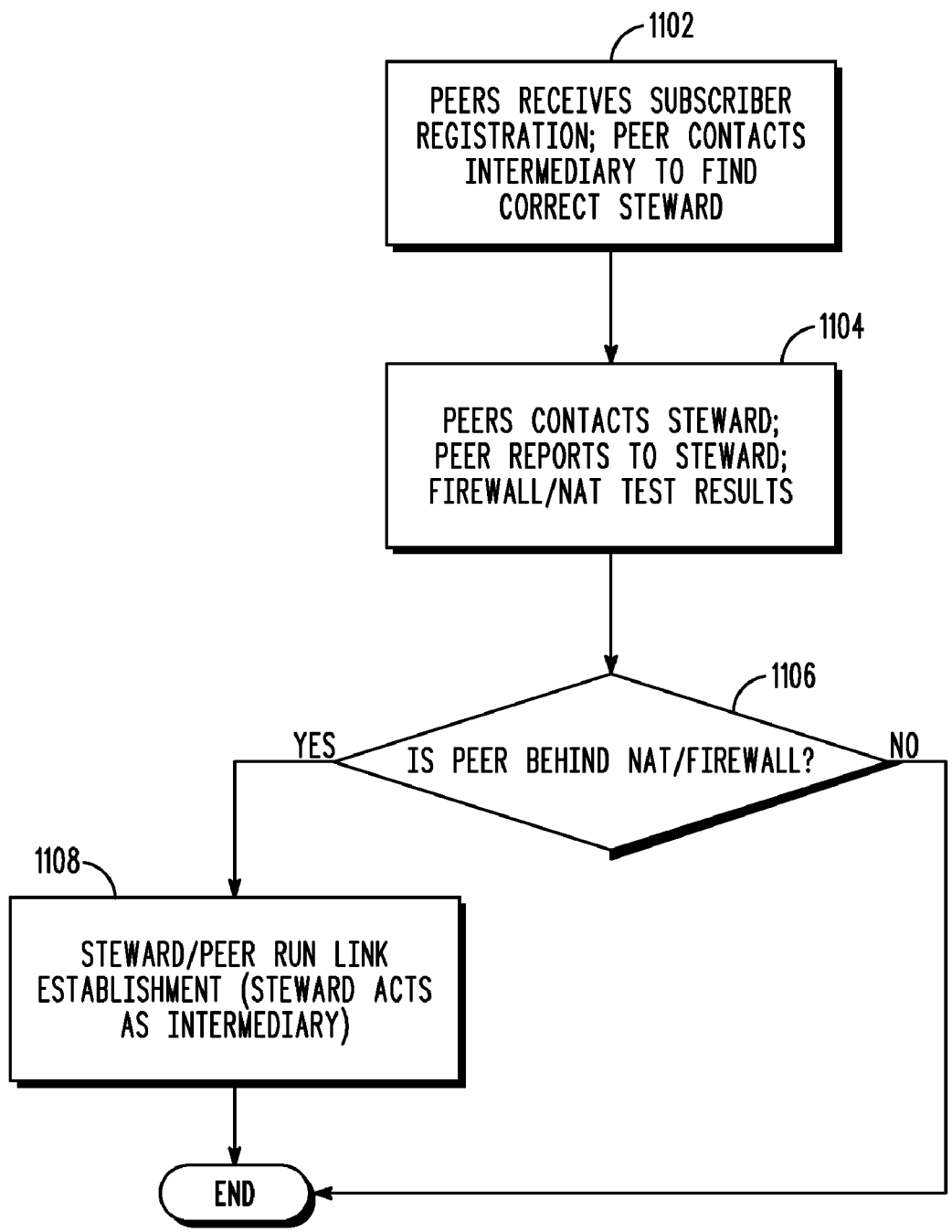
FIG. 11 is a flow chart identifying Steward Peer functions in accordance with some embodiments of the invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Referring now to FIG. 11, a flow chart for identifying stewards is shown. A subscriber is a mobile station, such as a radio. Peer3 408 receives a Subscriber Registration. Peer3 408 contacts 1102 the Intermediary 102 to find the Steward responsible for that Subscriber's call control. Peer3 408 asks the Intermediary 102 to identify the Steward 1104. The Intermediary 102 informs Peer3 408 that Peer1 104 is the responsible Steward. Peer3 408 contacts the Steward (e.g., Peer1 104 hereinafter also referred to as Steward 104). Peer3 408 reports its NAT/Firewall status to the Steward 104. The Steward 104 determines 1106 if Peer3 is behind NAT/Firewall. Peer3 408 and Steward 104 run link establishment 1108 as described hereinabove with respect to FIGS. 2, 5, and 7. However, the Steward 104 assumes the functions of the Intermediary 102. The Steward 104 acts as the Intermediary 102 only for the link establishment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for Peer-to-Peer link establishment over a network, the method comprising:
    an intermediate peer performing:
        creating a map comprising a plurality of peer IDs, source addresses and port numbers from a number of peers already networked in a peer-to-peer network, wherein the source addresses and port numbers are reserved for a next prospective peer to join the peer-to-peer network;
        maintaining an active link with the already networked peers;
        receiving, from the prospective peer, a request message comprising a request for a number representing the number of peers in the peer-to-peer network;
        sending, to the prospective peer in response to the request message, the number of peers in the peer-to-peer network and a number of ports to be opened between each peer;
        receiving, from the prospective peer, a plurality of command map request messages, wherein the number of command map requests received is equal to the number of peers in the peer-to-peer network multiplied by the number of ports to be opened between each peer, wherein each command map request message contains a source address and unique port number combination;
        updating a command map with the source address and unique port number from each of the command map request messages;
        sending the updated command map to the already networked peers and to the prospective peer for use in establishing or maintaining peer-to-peer links between the already networked peers and the prospective peer;
        receiving, from the already networked peers and from the prospective peer in response to receiving the updated command map, a keep alive message from a newly opened source port that was previously unused and;
        updating the map with the newly opened source port.

2. The link establishment method of claim 1, further comprising setting, by the intermediate peer, a link establishment semaphore in response to receiving the request message comprising the request for the number representing the number of peers in the peer-to-peer network.

3. The link establishment method of claim 2, further comprising canceling the link establishment semaphore after updating the map.

4. The link establishment method of claim 1, wherein the keep alive message further comprises a peer ID and source IP address.

5. The link establishment method of claim 1, wherein maintaining the active link comprises the intermediate peer performing:
- initiating a link active timer;
- receiving, from at least one of the already networked peers, a keep alive message for one of the port numbers in the map;
- sending, to the at least one of the networked peers, an acknowledgement; and
- resetting the link active timer.

6. The link establishment method of claim 1 further comprising the intermediate peer receiving at least one additional request message from a different prospective peer.

7. The link establishment method of claim 6 further comprising the intermediate peer performing:
- bundling all of the request messages;
- storing the request messages until a launch time.

8. The link establishment method of claim 1, further comprising:
- creating a steward list comprising a list of steward peers representing a number of peers capable of receiving request messages from a prospective peer.

* * * * *